(12) United States Patent
Ochiai et al.

(10) Patent No.: US 11,346,917 B2
(45) Date of Patent: May 31, 2022

(54) INFORMATION PROCESSING APPARATUS AND INFORMATION PROCESSING METHOD

(71) Applicant: SONY CORPORATION, Tokyo (JP)

(72) Inventors: Kazuki Ochiai, Kanagawa (JP); Shusuke Takahashi, Chiba (JP)

(73) Assignee: SONY CORPORATION, Tokyo (JP)

( * ) Notice: Subject to any disclaimer, the term of this patent is extended or adjusted under 35 U.S.C. 154(b) by 639 days.

(21) Appl. No.: 16/322,758

(22) PCT Filed: May 19, 2017

(86) PCT No.: PCT/JP2017/018875
§ 371 (c)(1),
(2) Date: Feb. 1, 2019

(87) PCT Pub. No.: WO2018/037643
PCT Pub. Date: Mar. 1, 2018

(65) Prior Publication Data
US 2021/0382131 A1    Dec. 9, 2021

(30) Foreign Application Priority Data

Aug. 23, 2016  (JP) ............................. JP2016-162779

(51) Int. Cl.
*H04R 3/00* (2006.01)
*G01S 3/808* (2006.01)
(Continued)

(52) U.S. Cl.
CPC ............ *G01S 3/8083* (2013.01); *G10L 15/22* (2013.01); *G10L 21/0232* (2013.01); *G10L 25/84* (2013.01)

(58) Field of Classification Search
CPC ....................................................... H04R 3/00
See application file for complete search history.

(56) References Cited

U.S. PATENT DOCUMENTS

2009/0323982 A1* 12/2009 Solbach ................. H04R 3/005
381/94.3
2011/0178798 A1* 7/2011 Flaks ....................... H04S 3/008
704/226
(Continued)

FOREIGN PATENT DOCUMENTS

JP       2014-056181 A    3/2014
JP       2014-187685 A    10/2014
(Continued)

OTHER PUBLICATIONS

Office Action for JP Patent Application dated Apr. 20, 2021.
(Continued)

*Primary Examiner* — Olisa Anwah
(74) *Attorney, Agent, or Firm* — Chip Law Group

(57) ABSTRACT

An information processing apparatus including an acquisition section that acquires acquire an acoustic signal indicating a sound collection result of a sound collection device group and a control section that calculates a first weight in accordance with a degree to which the acoustic signal acquired by the acquisition section is a signal obtained by observing stationary noise and to apply the first weight to a noise spatial correlation matrix that is a spatial correlation matrix obtained from a noise signal.

17 Claims, 14 Drawing Sheets

(51) Int. Cl.
  *G10L 15/22* (2006.01)
  *G10L 21/0232* (2013.01)
  *G10L 25/84* (2013.01)

(56) References Cited

U.S. PATENT DOCUMENTS

| | | | | |
|---|---|---|---|---|
| 2011/0305345 | A1* | 12/2011 | Bouchard | G10L 21/0208 381/23.1 |
| 2012/0035920 | A1* | 2/2012 | Hayakawa | G10L 21/0208 704/226 |
| 2013/0142343 | A1* | 6/2013 | Matsui | H04R 29/005 381/56 |
| 2013/0275077 | A1* | 10/2013 | Kim | G01S 3/80 702/141 |
| 2014/0072142 | A1 | 3/2014 | Nakadai et al. | |
| 2014/0241532 | A1* | 8/2014 | Sato | G01S 3/86 381/56 |
| 2014/0307886 | A1* | 10/2014 | Olsson | G10L 21/0232 381/71.7 |
| 2015/0139433 | A1* | 5/2015 | Funakoshi | H04R 3/005 381/71.1 |
| 2015/0255085 | A1* | 9/2015 | Yamabe | G10L 21/0208 704/226 |
| 2016/0241346 | A1* | 8/2016 | Hoffman | G10L 21/0224 |
| 2016/0379614 | A1* | 12/2016 | Matsumoto | G10L 21/0232 381/94.3 |
| 2018/0301157 | A1* | 10/2018 | Gunawan | G10L 21/0208 |

FOREIGN PATENT DOCUMENTS

| | | |
|---|---|---|
| JP | 2016-100735 A | 5/2016 |
| WO | 2017/094862 A1 | 6/2017 |

OTHER PUBLICATIONS

International Search Report and Written Opinion of PCT Application No. PCT/JP2017/018875, dated Jul. 11, 2017, 06 pages of ISRWO.

* cited by examiner

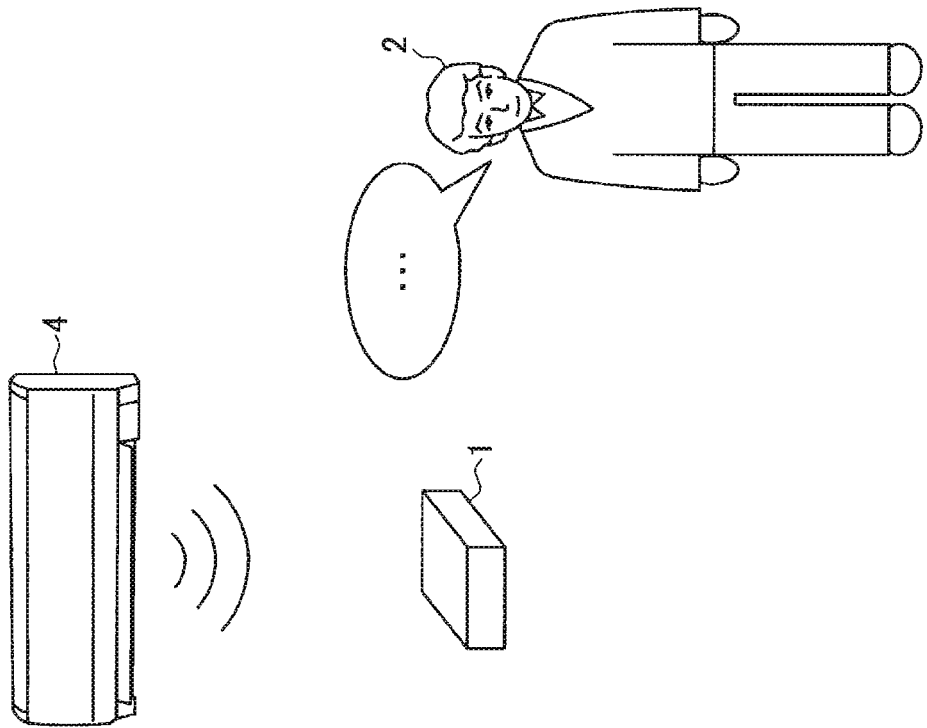
FIG. 1
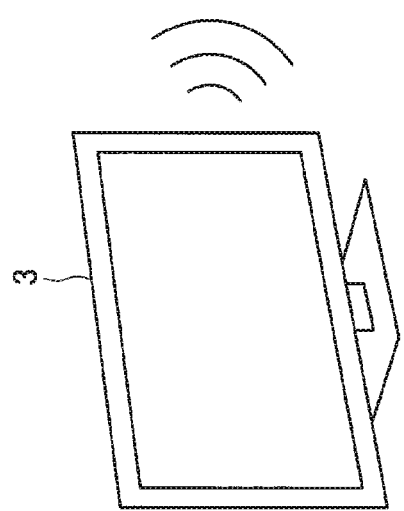

FIG. 13
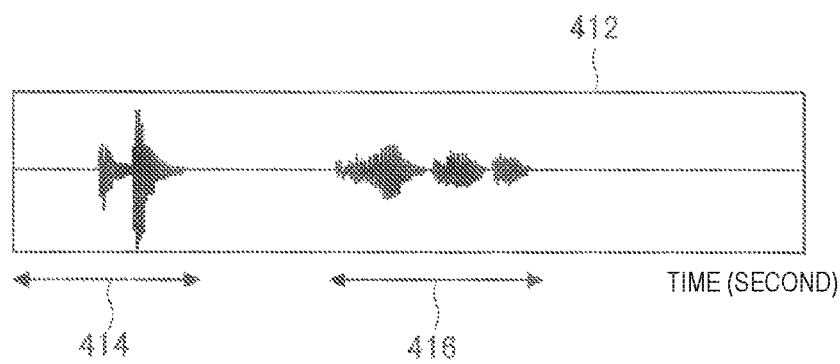
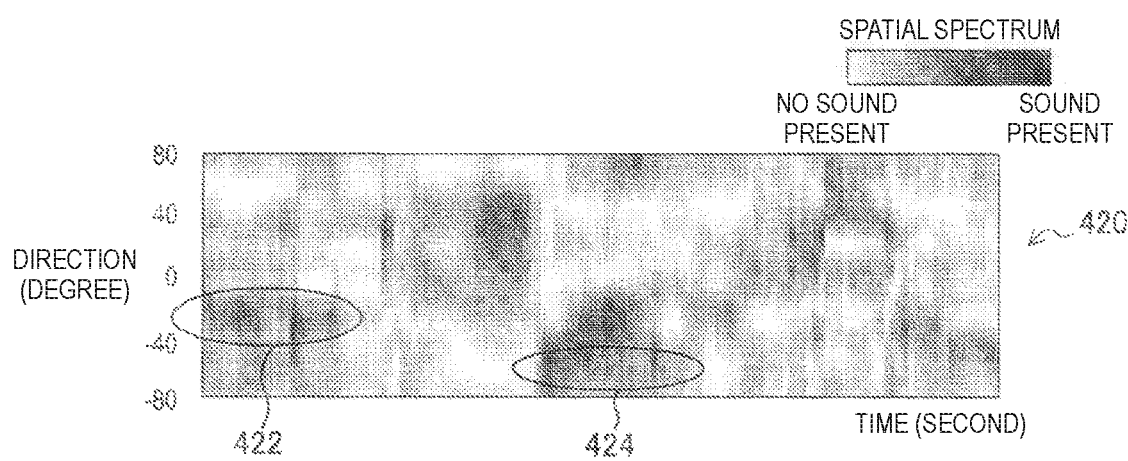
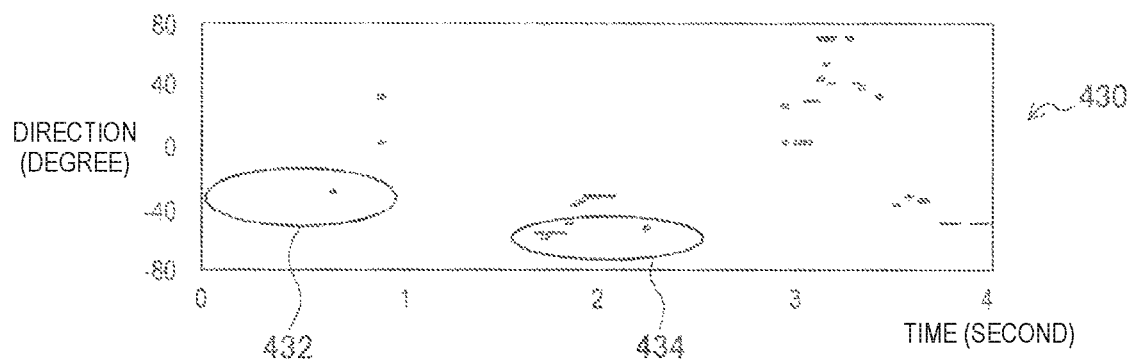

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/018875 filed on May 19, 2017, which claims priority benefit of Japanese Patent Application No. JP 2016-162779 filed in the Japan Patent Office on Aug. 23, 2016. Each of the above-referenced applications is hereby incorporated herein by reference in its entirety.

TECHNICAL FIELD

The present disclosure relates to an information processing apparatus, an information processing method, and a program.

BACKGROUND ART

In recent years, voice commands using voice recognition technologies have been widely used to operate a variety of equipment. In order to correctly recognize a voice command, it is desirable to estimate the direction of the speaker that is the sound source of the voice command with respect to a sound collection device with high accuracy. However, since various kinds of noise exist in a real environment, the accuracy in estimating the direction of the speaker can be lowered. Thus, technologies for improving the accuracy in estimating the direction of arrival of a voice in a noisy environment have been developed.

Patent Literature 1 mentioned below discloses, for example, a technology of calculating a correlation matrix of an input acoustic signal and a correlation matrix of a noise signal based on the acoustic signal and estimating the direction of the sound source of the acoustic signal on the basis of a spatial spectrum calculated on the basis of the two correlation matrixes.

CITATION LIST

Patent Literature

Patent Literature 1: JP 2014-56181A

DISCLOSURE OF INVENTION

Technical Problem

There are many technologies for improving accuracy in estimating the direction of arrival of a target sound by using a signal of a noise segment that is estimated to include only noise, as in the above-mentioned Patent Literature 1. However, the estimation accuracy of such a technology greatly depends on a segment to be employed as a noise segment. In a case in which an employed noise segment is inappropriate, for example, there is concern of the estimation accuracy significantly decreasing. Thus, it is desirable to provide a mechanism for evaluating the appropriateness of an employed noise segment.

Solution to Problem

According to the present disclosure, there is provided an information processing apparatus including: an acquisition section configured to acquire an acoustic signal indicating a sound collection result of a sound collection device group; and a control section configured to calculate a first weight in accordance with a degree to which the acoustic signal acquired by the acquisition section is a signal obtained by observing stationary noise and to apply the first weight to a noise spatial correlation matrix that is a spatial correlation matrix obtained from a noise signal.

In addition, according to the present disclosure, there is provided an information processing method including: acquiring an acoustic signal indicating a sound collection result of a sound collection device group; and calculating, by a processor, a first weight in accordance with a degree to which the acquired acoustic signal is a signal obtained by observing stationary noise and applying the first weight to a noise spatial correlation matrix that is a spatial correlation matrix obtained from a noise signal.

In addition, according to the present disclosure, there is provided a program causing a computer to function as: an acquisition section configured to acquire an acoustic signal indicating a sound collection result of a sound collection device group; and a control section configured to calculate a first weight in accordance with a degree to which the acoustic signal acquired by the acquisition section is a signal obtained by observing stationary noise and to apply the first weight to a noise spatial correlation matrix that is a spatial correlation matrix obtained from a noise signal.

Advantageous Effects of Invention

According to the present disclosure described above, a mechanism for evaluating the appropriateness of an employed noise segment is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram explaining an overview of an information processing apparatus according to an embodiment of the present disclosure.

FIG. 13 is a diagram illustrating the experiment result of the comparative technique.

MODE(S) FOR CARRYING OUT THE INVENTION

Figure 2:
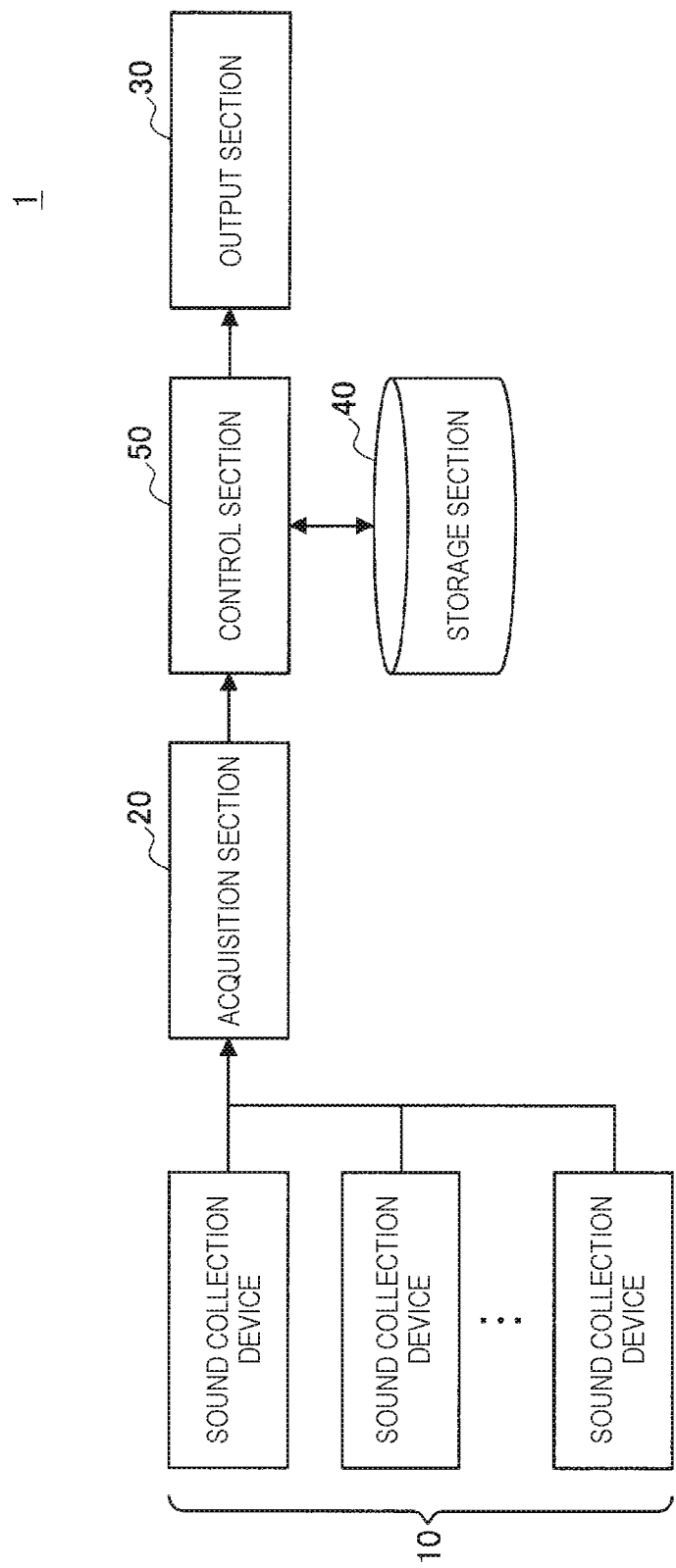
FIG. 2 is a block diagram illustrating an example of a logical configuration of the information processing apparatus according to the embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Introduction
1.1. Overview
1.2. MUSIC method
1.3. GEVD-MUSIC method
2. Configuration example
3. Flow of process
4. Modified examples
4.1. First modified example
4.2. Second modified example
4.3. Third modified example
4.4. Fourth modified example
4.5. Fifth modified example
5. Experiment results
6. Hardware configuration example
7. Conclusion

1. INTRODUCTION

1.1. Overview

FIG. 1 is a diagram for describing an overview of an information processing apparatus 1 according to an embodiment of the present disclosure. The information processing apparatus 1 has a sound collection device and receives an operation based on a voice of a user 2 through voice recognition of the sound collection result. However, the information processing apparatus 1 is assumed to be being used in an environment with noise sources such as a television receiver set 3 and an air conditioner 4 around the apparatus as illustrated in FIG. 1. Thus, it is desirable for the information processing apparatus 1 to be capable of receiving operations based on the voice of the user 2 in such an environment in which there are noise sources around the apparatus and the apparatus is separated from a speaker by a distance of several meters. Furthermore, it is desirable for the information processing apparatus 1 to be capable of receiving operations based on voices of the user 2 without pressing of a voice recognition start button or an instruction using a remote controller.

To that end, it is desirable to accurately detect a voice segment of a target sound (i.e., a voice of the user 2), suppress noise other than the target sound to emphasize the target sound, identify the user 2 operating the information processing apparatus 1, and the like. In addition, in order to realize these operations, it is desirable to appropriately perform a process of suppressing noise other than the target sound in collected sound.

If it is possible to appropriately prevent noise other than the target sound in collected sound, the direction of arrival of the target sound can be accurately estimated. In addition, the information processing apparatus 1 may create and apply an extraction filter that emphasizes the direction of arrival of the target sound (i.e., perform beam-forming) on the basis of information of the direction of arrival of the target sound and thereby can improve voice recognition accuracy.

In the present embodiment, the target sound is assumed to be a voice of a person. In addition, a direction of arrival of a voice is also referred to as a sound source direction. Estimation of a sound source direction will be described below in detail.

1.2. MUSIC Method

There is a Multiple Signal Classification (MUSIC) method as one of sound source direction estimation methods. The MUSIC method is a method that uses an eigenvector obtained from standard eigenvalue decomposition on the assumption that noise is white.

In the MUSIC method, first, a spatial filter being directed at a blind spot in a certain direction $\theta$ is created at a certain frequency $\omega$, the filter is spatially scanned ($\theta$ is changed to a candidate direction in which a target sound can exist), and thereby the degree to which sound comes in the direction $\theta$ is obtained. The degree is referred to as a spatial spectrum here. In addition, in the MUSIC method, the peak direction of the spatial spectrum is estimated as the direction of a sound source. Since scanning using the spatial filter is performed in the MUSIC method, the spatial spectrum becomes sharp with a narrow width, and a spatial resolution of the spatial spectrum becomes high.

Generally considered to have good performance, the MUSIC method can estimate, if the number of microphones is set to M, M−1 sound source directions in theory. However, the MUSIC method is required to give the number of sound sources to each frequency and there is concern of performance degradation in a real environment. This is because real environments do not match models of the MUSIC method since there are many noise sources therein and noise has color.

1.3. GEVD-MUSIC Method

As a preventive measure for performance degradation of the above-described MUSIC method in a real environment, a Generalized Eigen Value Decomposition (GEVD)-MUSIC method of performing eigenvalue decomposition (i.e., Generalized EigenValue Decomposition) after whitening noise and applying the MUSIC method has been proposed.

In the GEVD-MUSIC method, two spatial correlation matrixes that are a first spatial correlation matrix and a second spatial correlation matrix are used. Note that a spatial correlation matrix is a variance-covariance matrix that expresses a correlation (i.e., phase difference) between microphones.

The first spatial correlation matrix is a spatial correlation matrix of a time frame (which will also be referred to simply as a frame) of a segment in which a target sound is included. That is, the first spatial correlation matrix is a spatial correlation matrix of an acoustic signal in a segment whose sound source direction is to be estimated. A frame that is used to calculate the first spatial correlation matrix is also called a first calculation segment.

The second spatial correlation matrix is a spatial correlation matrix of a frame of a segment in which whitened noise is included. That is, the second spatial correlation matrix is a spatial correlation matrix obtained from a noise signal. The second spatial correlation matrix may also be called a noise spatial correlation matrix. A frame that is used to calculate the second spatial correlation matrix is also called a second calculation segment.

Here, it is desirable for the first calculation segment and the second calculation segment not to include a common frame. The reason for this is that, in a case in which a common frame is included, a common signal component is whitened, which makes it difficult to estimate a direction.

whitened. As a countermeasure for this, a method of selecting a second calculation segment on the basis of a determination result of voice/non-voice is conceivable. However, in this method, information that is selectable as a second calculation segment may disappear in a case in which, for example, speech continues at all times. In addition, in a case in which included noise components significantly differ in the first calculation segment and the second calculation segment, there is concern of the whitening effect decreasing, or conversely, an adverse influence. Therefore, it is desirable to calculate a second spatial correlation matrix using a calculation segment which includes a component similar to a noise component included in a first spatial correlation matrix.

As a case in which noise components included in a first spatial correlation matrix and a second spatial correlation matrix significantly differ, for example, a case in which sudden noise, that is, non-stationary noise, is included in a second calculation segment is conceivable. Non-stationary noise is noise without spatial stationarity or temporal stationarity. On the other hand, noise having spatial stationarity and temporal stationarity is called stationary noise. The following table shows examples of stationary noise and non-stationary noise.

TABLE 1

| Spatial stationarity | Temporal stationarity | Specific examples of noise sources |
| --- | --- | --- |
| Stationary | Stationary | Air conditioner, refrigerator, ventilation fan, PC fans, fan (with fixed direction), microwave oven, rice cooker, water coming from water tap, fan included in housing |
| | Non-stationary | TV, radio, music, musical instrument, toy, laundry machine, speaking of (sitting or standing) speaker, voice of (sitting or standing) person other than speaker, sound of cooking, tap water (for hand washing or dish washing) |
| Non-stationary | Stationary | Fan (swinging head), auto cleaning robot, wireless controllable robot |
| | Non-stationary | Speaking of (walking) speaker, footsteps, sound from moving chair, sound made outside room (car, train, bird, or wind) |
| Instantaneously generated sound (non-stationary) | | Sneeze, sound made by door closing, sound made when a utensil, toy, or the like hits on something, sound of pets, intercom, rubbing of clothes, rubbing of paper (newspaper or magazine) |

In the GEVD-MUSIC method, noise is whitened, and thus it is possible to perform estimation of a direction in a state in which the influence of noise included in an acoustic signal is cancelled out or suppressed. Thus, the GEVD-MUSIC method is considered to be capable of accurately performing the estimation of a direction of a target sound even in a noisy environment. However, in the GEVD-MUSIC method, how to obtain a second spatial correlation matrix significantly affects the estimation accuracy.

Therefore, first, it is desirable to accurately extract a noise component overlapping a target sound and obtain a second spatial correlation matrix on the basis of the noise signal. However, it is very difficult to realize the above operation. Thus, under the assumption that a noise component included in a segment immediately before speech is the same as the segment of a target sound, calculating a second spatial correlation matrix is normal. However, in a case in which the assumption is reversed, estimation performance significantly deteriorates.

In addition, second, it is desirable not to include a target sound in a second calculation segment. The reason for this is that, in a case in which a target sound is included, a sound component coming from the direction of the target sound is

2. CONFIGURATION EXAMPLE

FIG. 2 is a block diagram illustrating an example of a logical configuration of the information processing apparatus 1 according to the present embodiment. The information processing apparatus 1 includes a sound collection device group 10, an acquisition section 20, an output section 30, a storage section 40, and a control section 50 as illustrated in FIG. 2.

The sound collection device group 10 includes a plurality of sound collection devices. Each of the sound collection devices is, for example, a microphone, and collects surrounding sound and generates acoustic signals.

The acquisition section 20 acquires an acoustic signal indicating a sound collection result from the sound collection device group 10. The acquisition section 20 outputs the acquired acoustic signal to the control section 50.

The output section 30 outputs information. For example, the output section 30 outputs information output from the control section 50 in the form of sound, an image, or the like. The output section 30 may be a communication device that transmits information to an external device.

The storage section 40 temporarily or permanently stores information for operating the information processing apparatus 1. The control section 50 controls each of constituent elements of the information processing apparatus 1 and provides various functions of the information processing apparatus 1. For example, the control section 50 performs various calculations on the basis of input acoustic signals and outputs information indicating estimation results of sound source directions. A detailed configuration example of the storage section 40 and the control section 50 will be described below with reference to FIG. 3.

Figure 3:
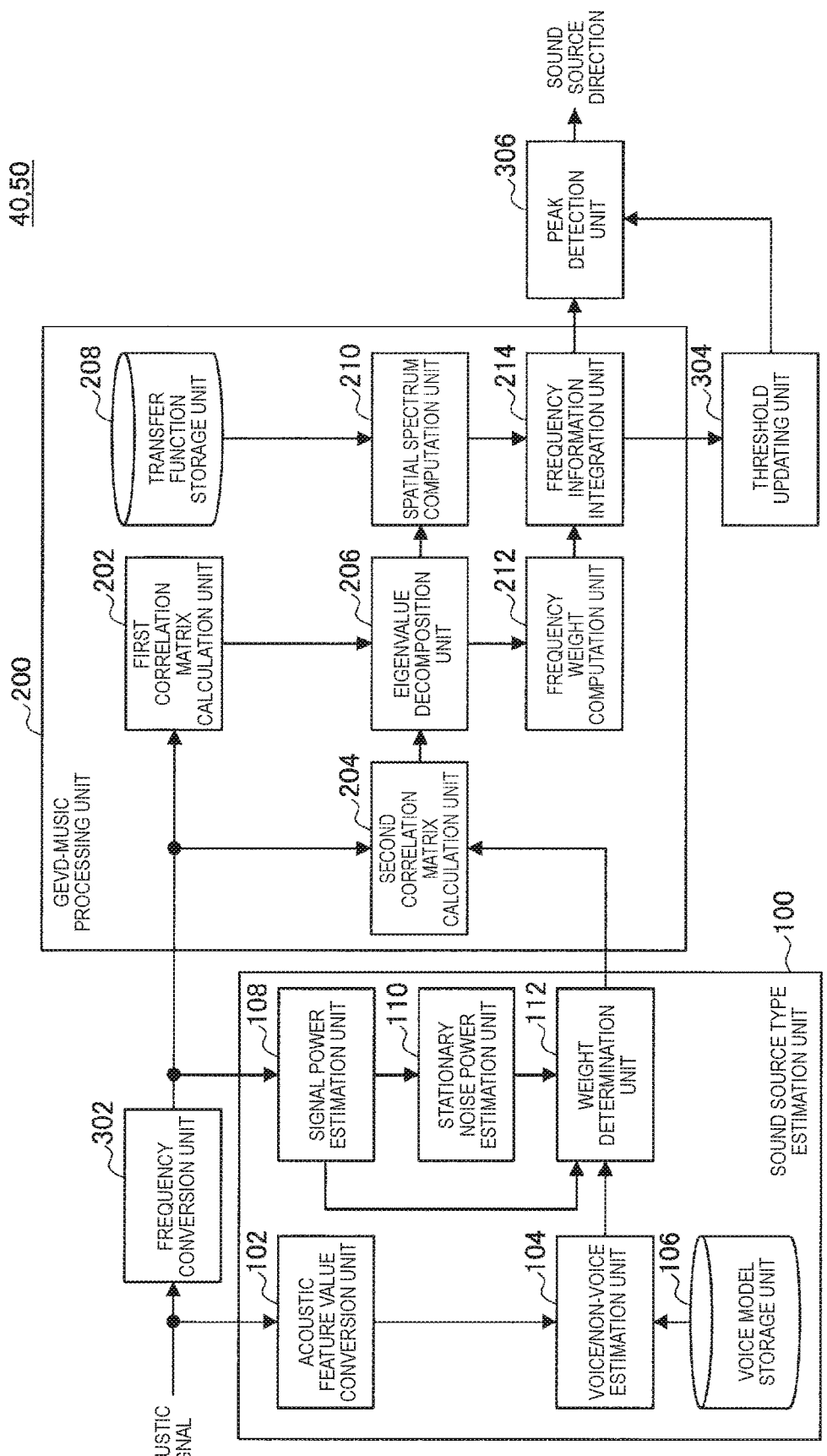
FIG. 3 is a block diagram illustrating a detailed example of the logical configuration of the information processing apparatus according to the embodiment.

FIG. 3 is a block diagram illustrating a detailed example of the logical configuration of the information processing apparatus 1 according to the present embodiment. The storage section 40 or the control section 50 according to the present embodiment includes a sound source type estimation unit 100, a GEVD-MUSIC processing unit 200, a frequency conversion unit 302, a threshold updating unit 304, and a peak detection unit 306 as illustrated in FIG. 3. Note that, in FIG. 3, constituent elements other than those necessary for the estimation of a sound source direction are not illustrated. That is, the storage section 40 and the control section 50 can include constituent elements other than those illustrated in FIG. 3.

The frequency conversion unit 302 converts an acoustic signal of a time domain acquired by the acquisition section 20 into a signal of a frequency domain by applying a Discrete Fourier Transform (DFT) or a Short-Time Fourier Transform (STFT) to each frame. A frame length and a frame shift may each be, for example, 32 milliseconds (ms) and 10 ms.

The sound source type estimation unit 100 calculates a weight in accordance with the degree to which an acoustic signal acquired by the acquisition section 20 is a signal obtained by observing stationary noise (which corresponds to a first weight). Specifically, the sound source type estimation unit 100 estimates the degree to which a voice is included in an acoustic signal and stationarity of the acoustic signal and calculates a weight on the basis of the result. Accordingly, as the acoustic signal of the second calculation segment includes less target sound and includes more noise components with stationarity that are highly likely to overlap with the target sound, a greater weight is applied to a second spatial correlation matrix. Thus, the estimation accuracy of the GEVD-MUSIC method can be improved. The sound source type estimation unit 100 includes an acoustic feature value conversion unit 102, a voice/non-voice estimation unit 104, a voice model storage unit 106, a signal power estimation unit 108, a stationary noise power estimation unit 110, and a weight determination unit 112 as illustrated in FIG. 3.

The acoustic feature value conversion unit 102 converts an acoustic signal of a time domain acquired by the acquisition section 20 into an acoustic feature value. The acoustic feature value is obtained through, for example, application of a 40-dimensional Mel filter bank.

The voice/non-voice estimation unit 104 calculates a voice-likeness (i.e., voice likelihood) of a sound included in the acoustic signal of a frame on the basis of the acoustic feature value converted by the acoustic feature value conversion unit 102. The voice/non-voice estimation unit 104 calculates the voice likelihood by, for example, inputting the acoustic special amount to a voice model stored in the voice model storage unit 106.

The voice model storage unit 106 stores voice models. For example, the voice model storage unit 106 stores voice models learned from a deep neural network (DNN) in advance.

The signal power estimation unit 108 calculates a power of a signal in each frame and each frequency on the basis of the signal of the frequency domain converted by the frequency conversion unit 302.

The stationary noise power estimation unit 110 calculates a power of the stationary noise in each frame and each frequency on the basis of the power of the signal in each frame and each frequency. The stationary noise power estimation unit 110 performs the calculation, for example, by using the following formula.

[Math. 1]

$$\mu_{\omega,t} = \exp[(1-\nu)\log \mu_{\omega,t-1} + \nu \log p_{\omega,t}^P] \quad (1)$$

Here, ν denotes an update coefficient of a power of stationary noise. In addition, $p^P_{\omega,t}$ denotes a power of a signal with frequency ω in a frame t.

The weight determination unit 112 calculates a weight to be used by a second correlation matrix calculation unit 204 on the basis of the degree to which the acoustic signal includes a voice and the stationarity of the acoustic signal. The degree to which the acoustic signal includes a voice corresponds to the voice likelihood output from the voice/non-voice estimation unit 104. The stationarity of the acoustic signal corresponds to the power of the signal output from the signal power estimation unit 108 and the power of the stationary noise output from the stationary noise power estimation unit 110 that are calculated on the basis of the power of the acoustic signal. The weight is calculated using, for example, the following formula.

[Math. 2]

$$\alpha_{\omega,t} = C \alpha_t^V \alpha_{\omega,t}^P \quad (2)$$

Here, C is a constant. In addition, $\alpha^V_t$ denotes a weight based on voice likelihood. In addition, $\alpha^P_{\omega,t}$ denotes a weight based on a power of stationary noise and a power of a signal.

The weight determination unit 112 performs calculation such that the weight based on voice likelihood becomes lower as the voice likelihood indicates a higher voice likeness. Accordingly, a greater weight is applied to a second spatial correlation matrix as a target sound is less included in the acoustic signal of a segment used in the calculation of the second spatial correlation matrix, and thus the estimation accuracy can be improved. The weight based on the voice likelihood is calculated using, for example, the following formula.

[Math. 3]

$$\alpha_t^V = \begin{cases} 0 & (p_t^V \geq P_{Th}) \\ 1 - p_t^V & (\text{otherwise}) \end{cases} \quad (3)$$

Here, $p^V_t$ denotes voice likelihood in a frame t. In addition, $p_{Th}$ denotes a threshold value of the voice likelihood. The weight determination unit 112 may set the weight to 0 in a case in which the voice likelihood is higher than or equal to the threshold value, and thereby can prevent the frame including a voice from being used in the calculation of the second spatial correlation matrix by the second correlation matrix calculation unit 204.

The weight determination unit 112 performs the calculation such that the weight based on the power of the stationary noise and the power of the signal decreases as the power of the signal becomes greater than the power of the stationary noise and increases as the power of the signal becomes smaller than the power of the stationary noise. Accordingly, the weight can be decreased as the target sound is closer to non-stationary noise. That is, a greater weight is applied to the second spatial correlation matrix as the acoustic signal of the segment used in the calculation of the second spatial correlation matrix includes more noise components with stationarity that are highly likely to overlap with the target sound, and thus the estimation accuracy can be improved. The weight based on the power of the stationary noise and the power of the signal is calculated using, for example, the following formula.

[Math. 4]

$$\alpha_{\omega,t}^P = \frac{1}{1 + c\exp\left(a\frac{p_{\omega,t}^P}{\mu_{\omega,t}} - b\right)} \quad (4)$$

Here, a, b, and c are constants.

The GEVD-MUSIC processing unit 200 calculates a spatial spectrum averaged in frequencies on the basis of the acoustic signal of the frequency domain and the calculation result from the sound source type estimation unit 100. The GEVD-MUSIC processing unit 200 includes a first correlation matrix calculation unit 202, the second correlation matrix calculation unit 204, an eigenvalue decomposition unit 206, a transfer function storage unit 208, a spatial spectrum computation unit 210, a frequency weight computation unit 212, and a frequency information integration unit 214 as illustrated in FIG. 3.

The first correlation matrix calculation unit 202 calculates a correlation matrix of a signal of each frame and each frequency. The correlation matrix calculated here is a first spatial correlation matrix. Note that each element of the matrix indicates the correlation between the respective sound collection devices included in the sound collection device group 10. The first spatial correlation matrix is calculated using, for example, the following formula.

[Math. 5]

$$R_{\omega,t} = \frac{1}{T_R} \sum_{\tau=t-T_R}^{t} z_{\omega,\tau} z_{\omega,\tau}^H \quad (5)$$

Here, $T_R$ denotes a frame length of a first calculation segment. In addition, $z_{\omega,t}$ denotes a signal with a frequency ω in a frame t.

The second correlation matrix calculation unit 204 calculates a correlation matrix of a noise signal of each frame and each frequency. In particular, the second correlation matrix calculation unit 204 applies the weight calculated by the weight determination unit 112 to a corresponding correlation matrix. The correlation matrix calculated here is a second spatial correlation matrix. The second spatial correlation matrix is calculated using, for example, the following formula.

[Math. 6]

$$K_{\omega,t} = \frac{1}{T_K} \sum_{\tau=t-\Delta t-T_K}^{t-\Delta t} \alpha_{\omega,\tau} z_{\omega,\tau} z_{\omega,\tau}^H \quad (6)$$

Here, $T_K$ denotes a frame length of a second calculation segment. In addition, Δt is a value for causing a signal of a common frame not to be used in $R_{\omega,t}$ and $K_{\omega,t}$.

Here, a weight $\alpha_{\omega,\tau}$ is calculated as a continuous value (e.g., from 0 to 1). However, the second spatial correlation matrix may be calculated using the following formula, taking that there can be cases in which the weight $\alpha_{\omega,\tau}$ becomes 0 at all τ into account.

[Math. 7]

$$K_{\omega,t} = (1-\alpha_{\omega,t})K_{\omega,t-1} + \alpha_{\omega,t} z_{\omega,t-\Delta t} z_{\omega,t-\Delta t}^H \quad (7)$$

According to the above-described formula, the second correlation matrix calculation unit 204 sequentially updates the second spatial correlation matrix to which the weight has been applied, which is subject to generalized eigenvalue decomposition by the eigenvalue decomposition unit 206 that is located in the later part, on the basis of the past second spatial correlation matrix to which a weight has been applied. With this update formula, stationary noise components can be used for a long period of time. Furthermore, in a case in which the weight is a continuous value from 0 to 1, the number of integration times of weights increases for older the second spatial correlation matrixes, the weight becomes smaller, and therefore, a greater weight is assigned to a stationary noise component of the latest time. Thus, the second spatial correlation matrix can be calculated in a state in which a greater weight is assigned to the stationary noise component of the latest time which is considered to be close to a stationary noise component present in the background of the target sound.

The eigenvalue decomposition unit 206 performs generalized eigenvalue decomposition based on the second spatial correlation matrix to which the weight has been applied and the first spatial correlation matrix to calculate an eigenvalue. For example, the eigenvalue decomposition unit 206 obtains an eigenvector $e_{\omega,t,i}$ satisfying the following formula.

[Math. 8]

$$R_{\omega,t} e_{\omega,t,i} = \lambda_{\omega,t,i} K_{\omega,t} e_{\omega,t,i} (i=1,\ldots,M) \quad (8)$$

Here, $\lambda_i$ denotes an i-th largest eigenvalue obtained through generalized eigenvalue decomposition. M denotes the number of sound collection devices included in the sound collection device group 10. $e_i$ denotes an eigenvector corresponding to $\lambda_i$.

The above formula can be modified to the following formula using a matrix ($\Phi_J$) satisfying $\Phi_{\omega,t}^H \Phi_{\omega,t} = K_{\omega,t}$ and becomes a problem of standard eigenvalue decomposition.

[Math. 9]

$$(\Phi_{\omega,t}^{-H} R_{\omega,t} \Phi_{\omega,t}^{-1}) f_{\omega,t,i} = \lambda_{\omega,t,i} f_{\omega,t,i} (f_{\omega,t,i} = \Phi_{\omega,t} e_{\omega,t,i}) \quad (9)$$

Here, $\Phi_{\omega,t}^{-H}$ is also called a whitening matrix. In addition, the left side of the above formula is a part in which $R_{\omega,t}$ is whitened in a stationary noise component, that is, a part from which the stationary noise component has been removed.

The transfer function storage unit 208 stores a transfer function. Here, the transfer function is a vector indicating a characteristic of a transfer from a sound source to each sound collection device.

The spatial spectrum computation unit 210 calculates a spatial spectrum on the basis of the calculation result of the eigenvalue decomposition unit 206 and the transfer function stored by the transfer function storage unit 208. For example, the spatial spectrum computation unit 210 calculates the degree of arrival of a sound from a θ direction (i.e., the spatial spectrum) using an eigenvector corresponding to the eigenvalue of the number of sound collection devices M—the number of sound sources N and a transfer function vector for the direction θ, starting from the smaller one. The spatial spectrum is calculated using, for example, the following formula.

[Math. 10]

$$P_{\omega,\theta,t}^n = \frac{a_{\omega,\theta}^H \Phi_{\omega,t}^{-1} \Phi_{\omega,t}^{-H} a_{\omega,\theta}}{a_{\omega,\theta}^H \Phi_{\omega,t}^{-1} F_{\omega,t}^n F_{\omega,t}^{nH} \Phi_{\omega,t}^{-H} a_{\omega,\theta}} \quad (10)$$

$$(F_{\omega,t}^n = [f_{\omega,t,N+1}, \ldots, f_{\omega,t,M}])$$

Here, N denotes the number of sound sources. θ denotes a direction in which the spatial spectrum is calculated. $a_\theta$ denotes a steering vector (i.e., a transfer function) in the θ direction.

The frequency weight computation unit 212 calculates a weight (which corresponds to a second weight) based on the contribution of the spatial spectrum at each frequency. In a method based on the MUSIC method, while power information is lost from the spatial spectrum at each frequency, power components are included in eigenvalues obtained when generalized eigenvalue decomposition is performed, and particularly, the distribution of the values shows a spatial bias. For example, in a case in which a sound has arrived from a certain direction, only eigenvalues in the number of sound sources increase, and thus a bias appears in the distribution of the eigenvalues. Thus, the frequency weight computation unit 212 calculates the weight based on the contribution of the spatial spectrum at each frequency on the basis of the distribution of the eigenvalues. The weight based on the contribution of the spatial spectrum at each frequency is calculated using, for example, the following formula by dividing the maximum eigenvalue of each frequency by the sum of the eigenvalues.

[Math. 11]

$$w_{\omega,t} = \frac{\lambda_{\omega,t,1}}{\sum_{m=1}^{M} \lambda_{\omega,t,m}} \quad (i = 1, \ldots, M) \quad (11)$$

The frequency information integration unit 214 weights the spatial spectrum at each frequency using the weight based on the contribution calculated by the frequency weight computation unit 212 and integrates the results. The direction estimation accuracy can be improved by performing the weighting using the weight based on the contribution such that the weight of the frequency band in which a sound source is likely to exist increases. The integration of the spatial spectrums is calculated using, for example, the following formula.

[Math. 12]

$$\overline{P}_{\theta,t}^n = \frac{\sum_\omega w_{\omega,t}}{\sum_\omega \frac{w_{\omega,t}}{P_{\omega,\theta,t}^n}} \quad (12)$$

Note that, although the harmonic mean is used in the above formula, the arithmetic mean, the geometric mean, or the like may be used other than that.

Here, a value of a spatial spectrum may increase in all directions in a case in which a sound has arrived. If a situation in which a sound source direction is estimated through comparison of a value with a threshold value in the peak detection unit 306 located in the later part is considered, the value of the spatial spectrum exceeds the threshold value in all directions in the case in which the sound has arrived, and there is concern of an estimation error occurring. Thus, the frequency information integration unit 214 performs normalization of an integrated spatial spectrum using the following formula.

[Math. 13]

$$\hat{P}_{\theta,t}^n = \log \overline{P}_{\theta,t}^n - \min_{\theta'} \log \overline{P}_{\theta',t}^n \quad (13)$$

Since the minimum value is 0 due to the above-described normalization, the peak that is irrelevant to the sound source is suppressed to be equal to or lower than the threshold value by the peak detection unit 306 located in the later part, and thereby the occurrence of an estimation error can be prevented. Here, the bottom of log is arbitrary, and for example, a Napier's number is used.

The threshold updating unit 304 calculates a threshold value that serves as a criterion for detecting a peak in the spatial spectrum output from the GEVD-MUSIC processing unit 200. Due to threshold value, it is possible to reject a peak having a small value while no sound source exists in the direction.

In particular, the threshold updating unit 304 sequentially updates the threshold value using a value of a past spatial spectrum. By sequentially updating the threshold value, a peak of a sound that is continuously made from a certain direction such as a sound from a television receiver set or the like can be rejected. Since a target sound is a voice command or a short voice such as speech for operating an apparatus, the rejection of a sound that continues for a long period of time enables a sound source direction to be estimated with higher accuracy. The threshold value is calculated using, for example, the following formula.

[Math. 14]

$$P_{\theta,t}^{th} = \beta^{th} D_{\theta,t}^{th} + \max\left[\gamma^{th}, \frac{1}{\Theta}\sum_{\theta'=1}^{\Theta} \hat{P}_{\theta',t}^n\right] \quad (14)$$

$$(D_{\theta,t}^{th} = (1 - \alpha^{th})D_{\theta,t-1}^{th} + \alpha^{th}\hat{P}_{\theta,t}^n)$$

Here, $\alpha^{th}$, $\beta^{th}$ and $\gamma^{th}$ are constants. In addition, Θ denotes the number of scanning directions.

The peak detection unit 306 estimates a sound source direction with respect to the sound collection device group 10 on the basis of the spatial spectrum output from the GEVD-MUSIC processing unit 200. More specifically, the peak detection unit 306 detects the direction in which the peak of the spatial spectrum rises and estimates the direction thereof as the sound source direction. At this time, the peak detection unit 306 estimates the direction in which the peak of the spatial spectrum rises exceeding the threshold value output from the threshold updating unit 304 as the sound source direction. By using the sequentially updated threshold value, the above-described rejection is realized.

3. FLOW OF PROCESS

Figure 4:
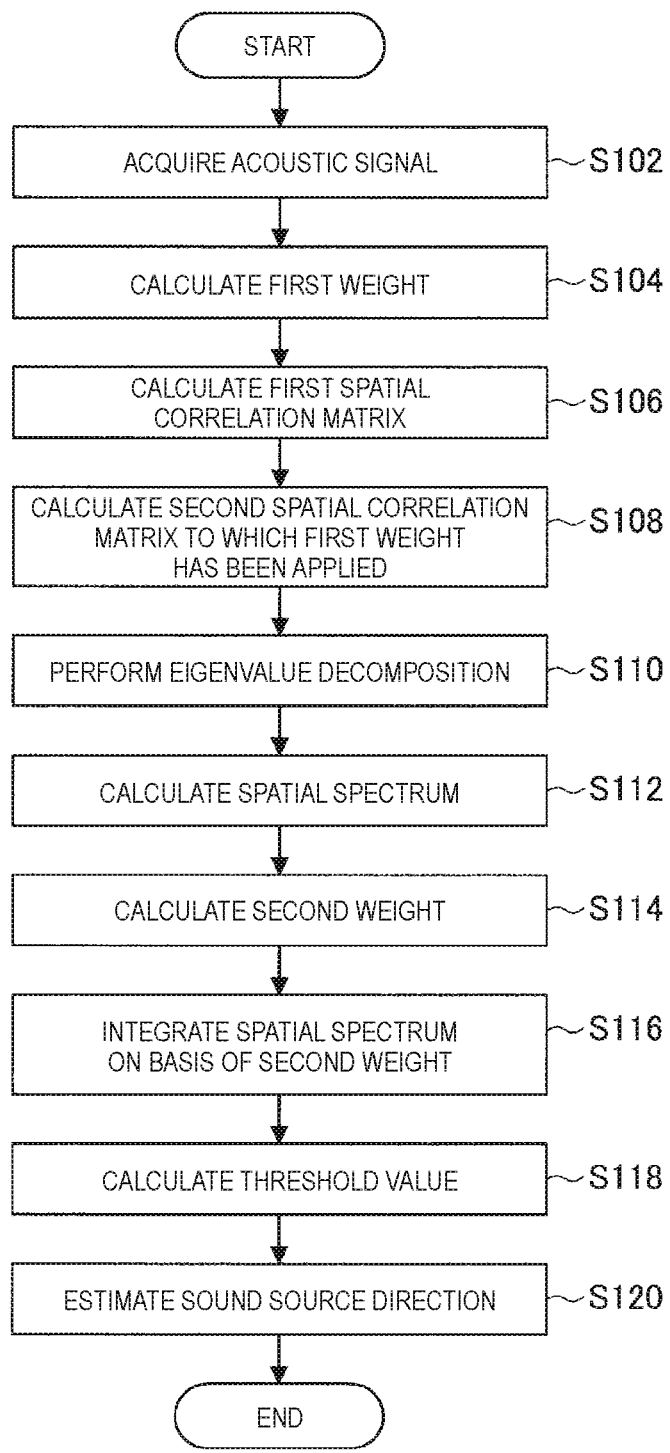
FIG. 4 is a flowchart showing an example of the flow of a sound source direction estimation process of the information processing apparatus according to the embodiment.

FIG. 4 is a flowchart showing an example of the flow of a sound source direction estimation process of the information processing apparatus 1 according to the present embodiment. First, the information processing apparatus 1 acquires an acoustic signal indicating a sound collection result from the sound collection device group 10 (Step S102) as illustrated in FIG. 4. Next, the information processing apparatus 1 calculates a first weight in accordance with the degree to which the acquired acoustic signal is a signal obtained by observing stationary noise (Step S104). For example, the information processing apparatus 1 calculates the first weight on the basis of voice likelihood and a power of the voice. Next, the information processing apparatus 1 calculates a first spatial correlation matrix, calculates a second spatial correlation matrix to which the first weight has been applied, and then performs eigenvalue decomposition on the basis of the spatial correlation matrixes (Steps S106, S108, and S110). Next, the information processing apparatus 1 calculates a spatial spectrum on the basis of the result of the eigenvalue decomposition and a transfer function (Step S112). Next, the information processing apparatus 1 calculates a second weight on the basis of the contribution of spatial spectrums (Step S114). Next, the information processing apparatus 1 weights the spatial spectrums using the second weight and integrates them (Step S116). Next, the information processing apparatus 1 calculates a threshold value using values of the integrated current and past spatial spectrums (Step S118). Then, the information processing apparatus 1 estimates the direction in which the peak of the integrated spatial spectrum rises exceeding the threshold value as a sound source direction (Step S120). Thereby, the process is terminated.

4. MODIFIED EXAMPLES

Various modified examples will be described below. However, matters overlapping with the above description will be omitted.

4.1. First Modified Example

In a first modified example, stationarity of an acoustic signal is calculated on the basis of a feature value of the acoustic signal. More specifically, in the first modified example, instead of a weight based on the ratio of a power of stationary noise and a power of a signal, a weight based on sudden noise likelihood indicated by a feature value of an acoustic signal is used.

Figure 5:
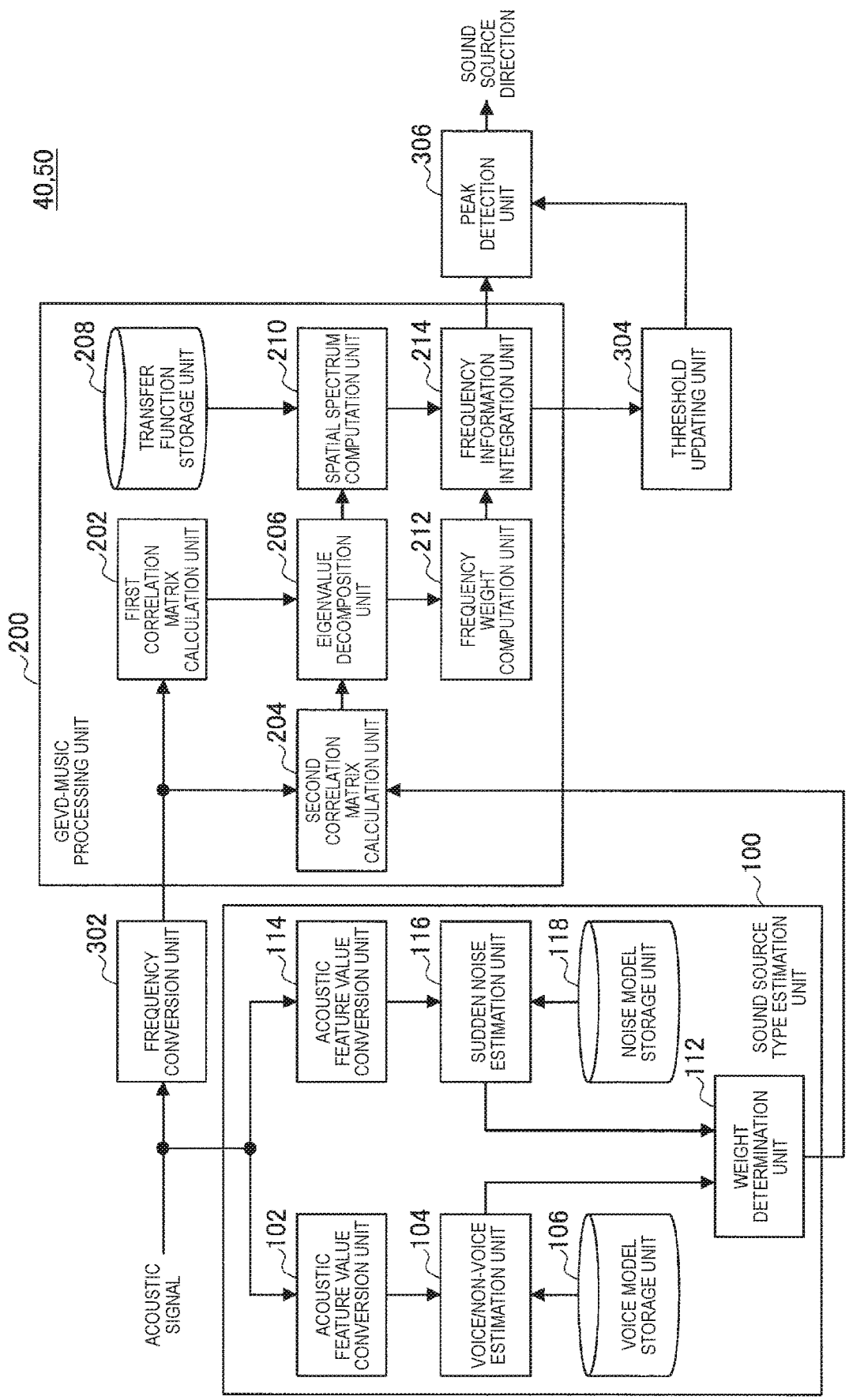
FIG. 5 is a block diagram illustrating a detailed example of a logical configuration of an information processing apparatus according to a first modified example.

FIG. 5 is a block diagram illustrating a detailed example of a logical configuration of an information processing apparatus 1 according to the first modified example. The information processing apparatus 1 according to the present modified example includes an acoustic feature value conversion unit 114, a sudden noise estimation unit 116, and a noise model storage unit 118 as illustrated in FIG. 5, instead of the signal power estimation unit 108 and stationary noise power estimation unit 110 illustrated in FIG. 3.

The acoustic feature value conversion unit 114 converts an acoustic signal of a time domain acquired by the acquisition section 20 into an acoustic feature value. The acoustic feature value is obtained through, for example, application of 40-dimensional Mel filter bank.

The sudden noise estimation unit 116 calculates a sudden noise likeness (i.e., sudden noise likelihood) of a sound included in the acoustic signal of a frame on the basis of the acoustic feature value converted by the acoustic feature value conversion unit 114. The sudden noise estimation unit 116 calculates sudden noise likelihood by, for example, inputting the acoustic special amount into a noise model stored in the noise model storage unit 118.

The noise model storage unit 118 stores a noise model. For example, the noise model storage unit 118 stores a noise model learned from a DNN in advance.

The weight determination unit 112 calculates a weight to be used by the second correlation matrix calculation unit 204 on the basis of voice likelihood and the sudden noise likelihood. The weight determination unit 112 calculates a weight using the product of a weight based on the voice likelihood and a weight based on the sudden noise likelihood, similarly to the above-described formula 2.

The weight determination unit 112 performs calculation such that the weight based on the sudden noise likelihood becomes lower as the sudden noise likelihood indicates a higher sudden noise likeness. Accordingly, a greater weight is applied to a second spatial correlation matrix as more noise components with stationarity that are highly likely to overlap with a target sound are included in the acoustic signal of a segment used in the calculation of the second spatial correlation matrix, and thus the estimation accuracy can be improved. The weight based on the sudden noise likelihood is calculated using, for example, the following formula.

[Math. 15]

$$\alpha_t^P = \begin{cases} 0 & (p_t^P \geq p_{Th}^P) \\ 1 - p_t^P & \text{(otherwise)} \end{cases} \quad (15)$$

Here, $P_t^P$ denotes sudden noise likelihood in a frame t. In addition, $P_{Th}^P$ denotes the threshold value of sudden noise likelihood.

According to the present modified example, it is possible to accurately determine noise having a small power but characteristics. In a case in which a weight based on a ratio of a power of stationary noise to a power of a signal is used, no noise model is necessary. On the other hand, in the case of the present modified example, noise can be determined more accurately using a noise model.

4.2. Second Modified Example

According to a second modified example, a directivity pattern is used in addition to a spatial spectrum to estimate a sound source direction. A directivity pattern is the degree to which a sound arrives from each direction, and specifically is correspondence data of a direction of a highly sensitive spatial filter with respect to a sound source direction and a gain.

Figure 6:
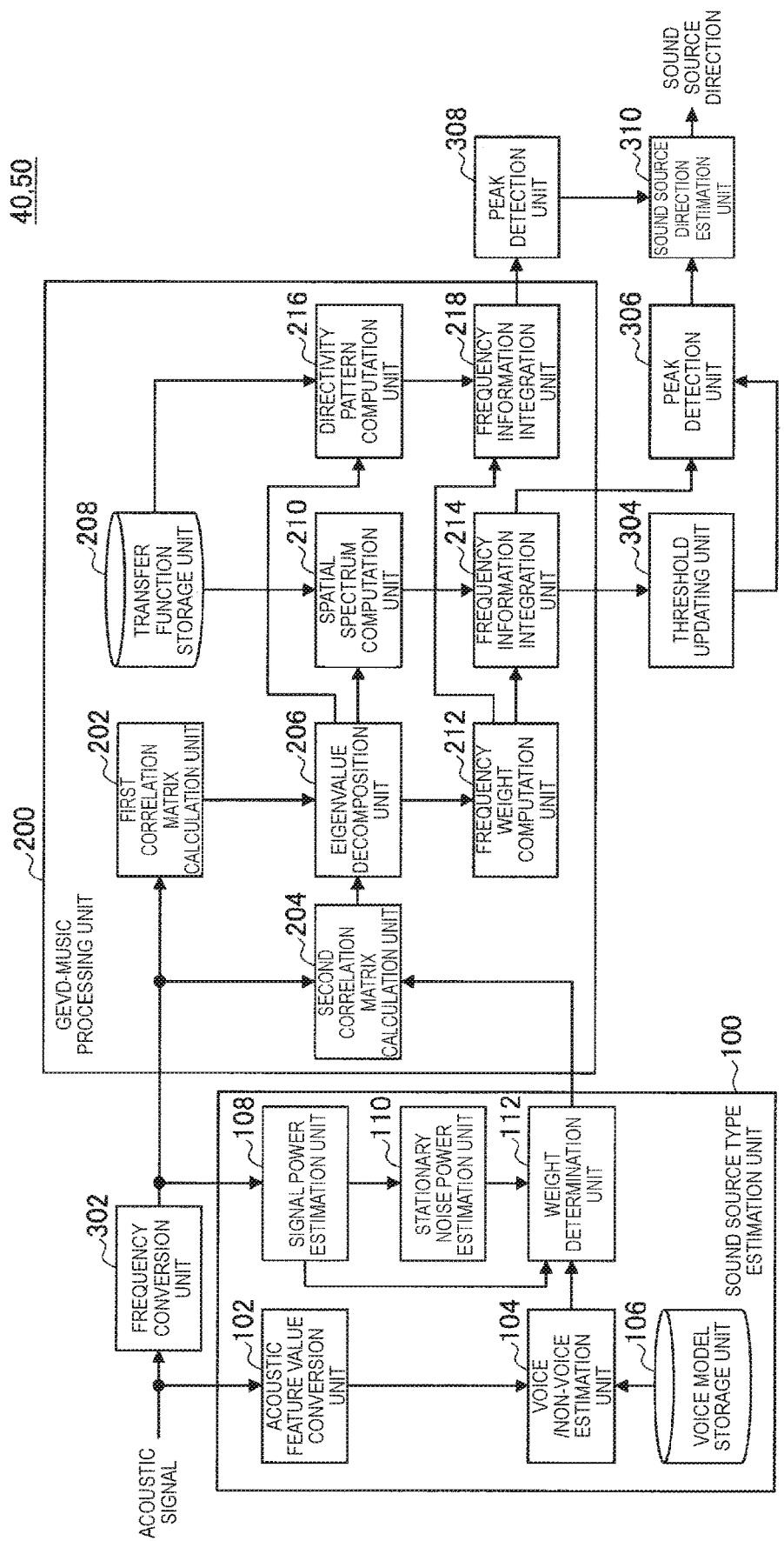
FIG. 6 is a block diagram illustrating a detailed example of a logical configuration of an information processing apparatus according to a second modified example.

FIG. 6 is a block diagram illustrating an example of a specific logical configuration of an information processing apparatus 1 according to the second modified example. The information processing apparatus 1 according to the present modified example includes a directivity pattern computation unit 216 and a frequency information integration unit 218 in the GEVD-MUSIC processing unit 200 and further includes a peak detection unit 308 and a sound source direction estimation unit 310, in addition to the configuration illustrated in FIG. 3, as illustrated in FIG. 6.

The directivity pattern computation unit 216 calculates a directivity pattern on the basis of a calculation result of generalized eigenvalue decomposition. The directivity pattern computation unit 216 calculates a directivity pattern by calculating the degree to which a sound arrives from each direction using an eigenvector corresponding to a maximum eigenvalue and a transfer function vector. The degree to which a sound arrives from each direction is calculated using, for example, the following formula.

[Math. 16]

$$P_{\omega,\theta,t}^{d} = \alpha_{\omega,\theta}^{H} \Phi_{\omega,t}^{-1} f_{\omega,t,1}^{H} \Phi_{\omega,t}^{-H} \alpha_{\omega,\theta} \quad (16)$$

The frequency information integration unit 218 integrates directivity patterns of each frequency. For example, the frequency information integration unit 218 weights the directivity patterns using a weight based on the contribution calculated by the frequency weight computation unit 212 and integrates them, similarly to the frequency information integration unit 214.

The peak detection unit 308 detects the peak of the directivity patterns output from the GEVD-MUSIC processing unit 200. Then, the peak detection unit 308 outputs the direction in which the detected peak is taken as a sound source direction.

The sound source direction estimation unit 310 integrates output results from the peak detection unit 306 and the peak detection unit 308 and estimates the sound source direction. For example, the sound source direction estimation unit 310 estimates a direction overlapping with the sound source direction output from the peak detection unit 306 and the sound source direction output from the peak detection unit 308, that is, the direction in which the peak rises in both the spatial spectrum and the directivity pattern, as the sound source direction. Note that both directions do not necessarily match each other, and thus a deviation may be tolerable when an overlap of the directions is determined. For example, a deviation of about 6 degrees is tolerable.

According to the present modified example, the estimation accuracy of a sound source direction can be improved by rejecting a part in which a peak has risen in a spatial spectrum or a directivity pattern sometimes.

4.3. Third Modified Example

In a third modified example, in a case in which an information processing apparatus 1 reproduces sound such as a voice, music, or the like in itself, a reproduction signal of the sound may be added to the calculation of a second spatial correlation matrix.

Figure 7:
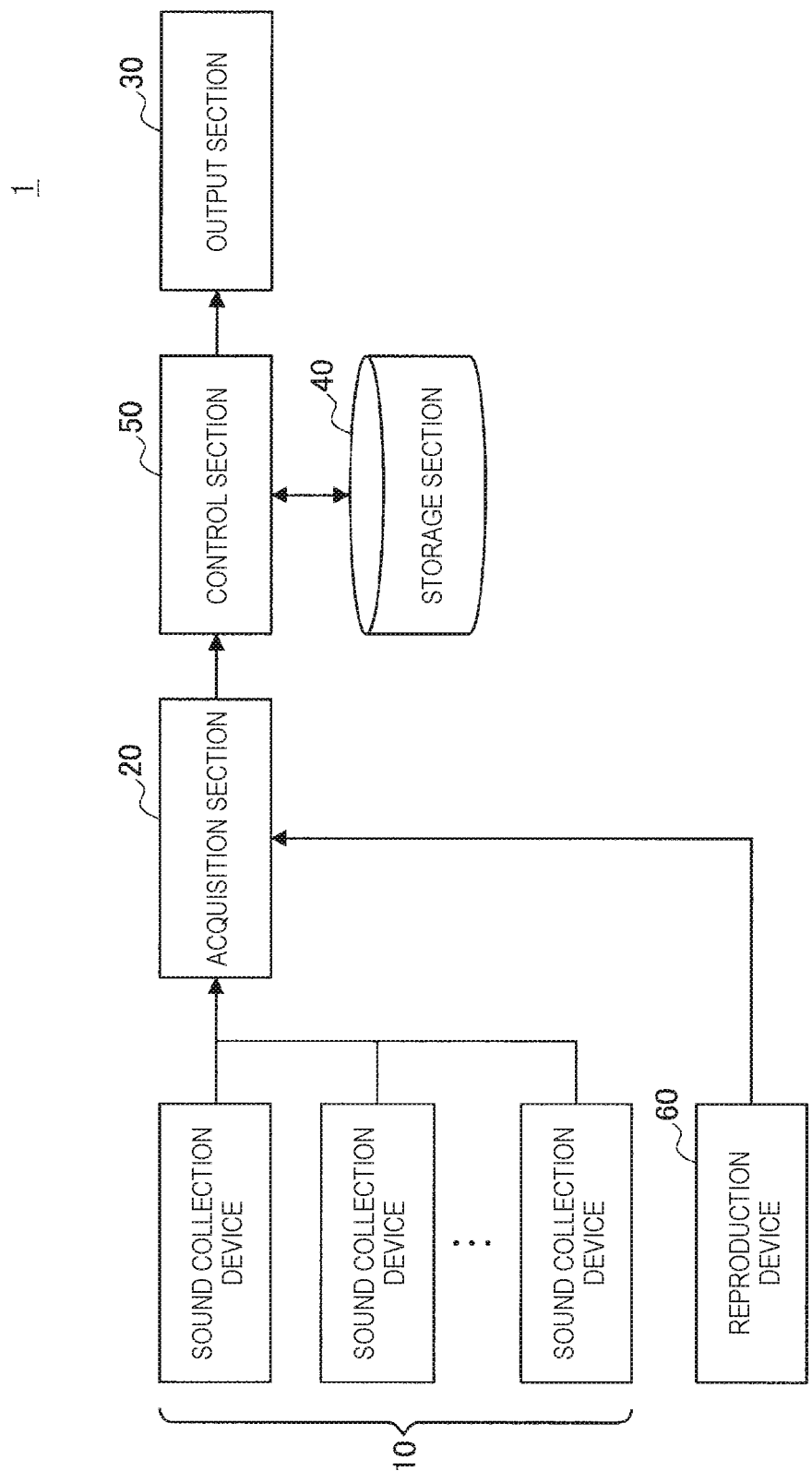
FIG. 7 is a block diagram illustrating an example of a logical configuration of an information processing apparatus according to a third modified example.

FIG. 7 is a block diagram illustrating an example of a logical configuration of an information processing apparatus 1 according to the third modified example. The information processing apparatus 1 according to the present modified example includes a reproduction device 60 in addition to the configuration illustrated in FIG. 2, as illustrated in FIG. 7. The reproduction device 60 is a device such as a speaker that reproduces sound in accordance with reproduction signals. An acquisition section 20 acquires reproduction signals from the reproduction device 60.

Figure 8:
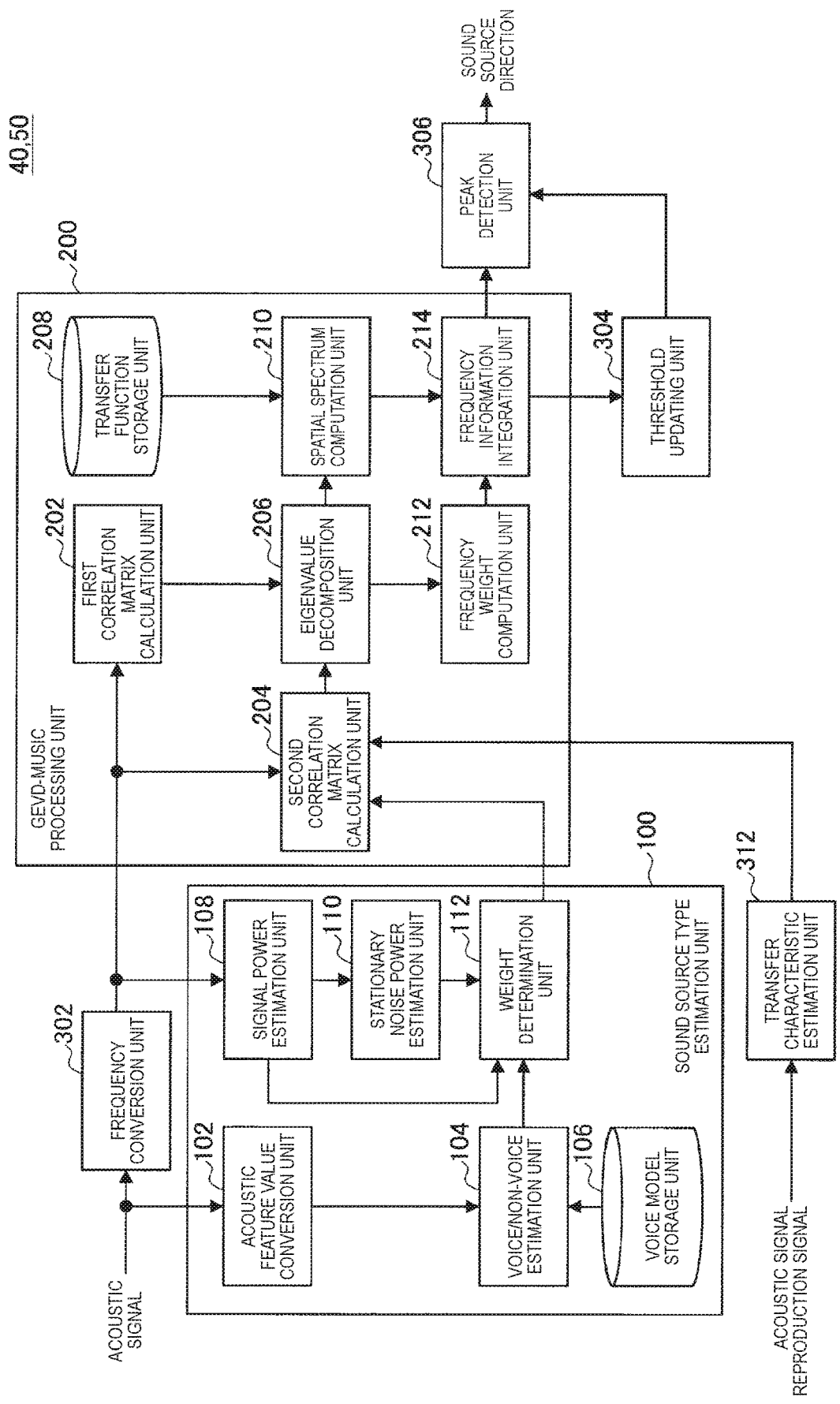
FIG. 8 is a block diagram illustrating a detailed example of a logical configuration of an information processing apparatus according to the third modified example.

FIG. 8 is a block diagram illustrating an example of a detailed logical configuration of the information processing apparatus 1 according to the third modified example. The information processing apparatus 1 according to the third modified example includes a transfer characteristic estimation unit 312 in addition to the configuration illustrated in FIG. 3 as illustrated in FIG. 8.

The transfer characteristic estimation unit 312 estimates a transfer characteristic of a sound transmitted from the reproduction device 60 to the sound collection device group 10 in the air on the basis of an acoustic signal and a reproduction signal acquired by the acquisition section 20. In a case in which a positional relation between the reproduction device 60 and the sound collection device group 10 is known and immovable, the transfer characteristic estimation unit 312 may store a result measured in advance.

The GEVD-MUSIC processing unit 200 calculates a second spatial correlation matrix on the basis of the reproduction signal of the sound which has been collected by the sound collection device group 10 and reproduced by the reproduction device 60. Specifically, the second correlation matrix calculation unit 204 calculates a second spatial correlation matrix further on the basis of the transfer characteristic estimated by the transfer characteristic estimation unit 312. The second spatial correlation matrix according to the present modified example is calculated using, for example, the following formula.

[Math. 17]

$$K_{\omega,t} = \frac{1}{T_K} \sum_{\tau=t-\Delta t-T_K}^{t-\Delta t} (\alpha_{\omega,\tau} z_{\omega,\tau} z_{\omega,\tau}^{H} + s_{\omega,\tau} s_{\omega,\tau}) \quad (17)$$

Here, $s_{\omega,t}$ denotes the product of a reproduction signal at a frequency ω at a time t and an estimated transfer characteristic.

According to the present modified example, it is possible to estimate a sound source direction in a state in which a reproduction signal is suppressed, as in acoustic echo cancelling.

4.4. Fourth Modified Example

In a fourth modified example, mobility of a noise source is added.

Figure 9:
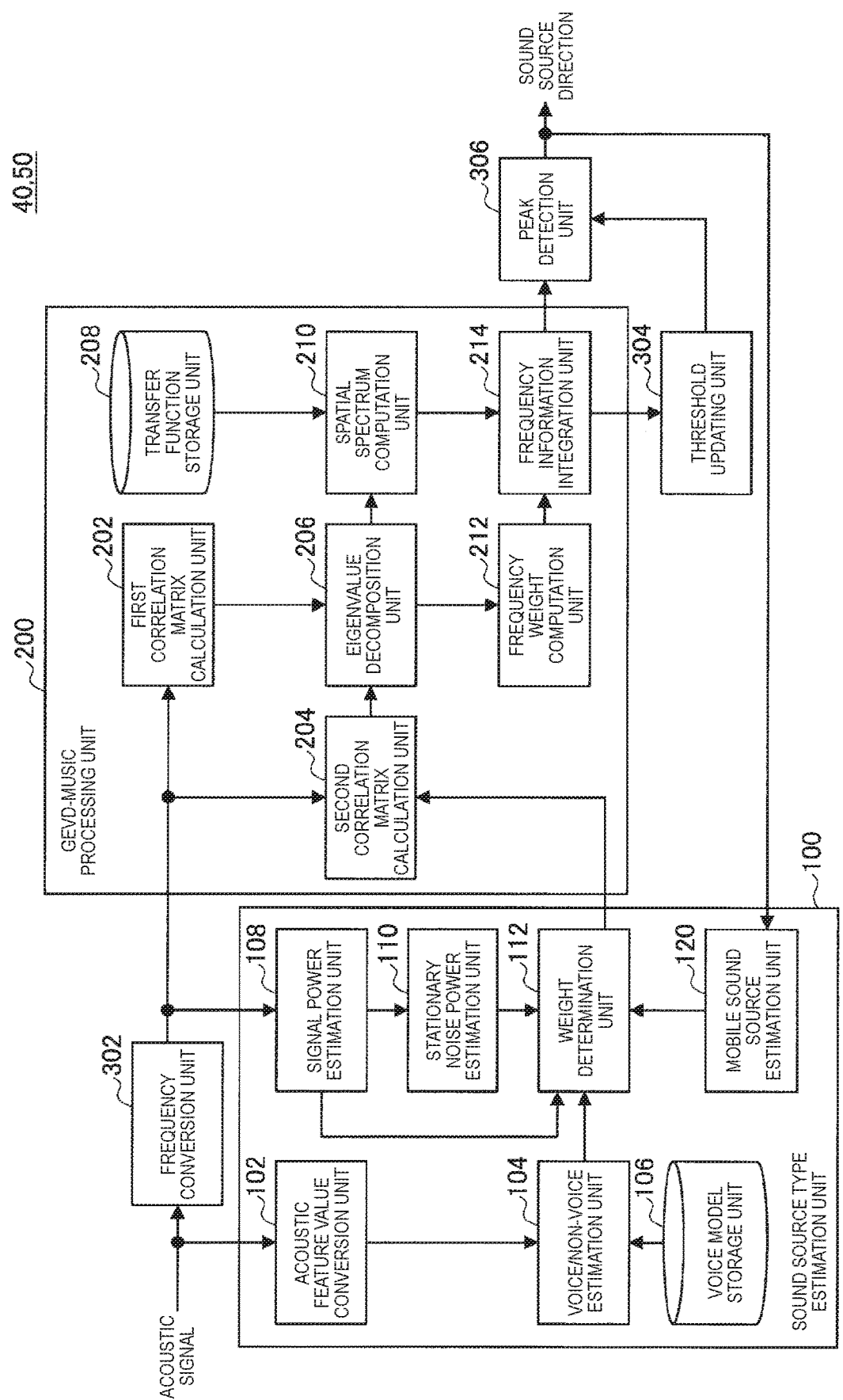
FIG. 9 is a block diagram illustrating a detailed example of a logical configuration of an information processing apparatus according to a fourth modified example.

FIG. 9 is a block diagram illustrating an example of a detailed logical configuration of an information processing apparatus 1 according to the fourth modified example. The information processing apparatus 1 according to the present modified example includes a mobile sound source estimation unit 120 in the sound source type estimation unit 100 in addition to the configuration illustrated in FIG. 3, as illustrated in FIG. 9.

The mobile sound source estimation unit 120 estimates mobility of a sound source. Specifically, the mobile sound source estimation unit 120 tracks a sound source on the basis of a sound source direction that was output from the peak detection unit 306 in the past and thereby estimates a mobile sound source likeness, that is, mobility, of the sound source.

A particle filter, for example, is used in this sound source tracking. Then, the mobile sound source estimation unit 120 calculate a weight based on the mobility of the sound source using a continuous value (e.g., from 0 to 1). The weight based on the mobility of the sound source is calculated by using, for example, the following formula.

[Math. 18]

$$\alpha_t^M = \begin{cases} 1 - \frac{|\theta_t - \theta_{t_0}|}{L} & (|\theta_t - \theta_{t_0}| \leq L) \\ 1 & \text{(otherwise)} \end{cases} \quad (18)$$

Here, $\alpha^M t$ denotes a weight based on mobility of a sound source. L denotes a maximum angular deviation for connection in tracking. $\theta t$ denotes a sound source direction estimated in a frame t. $\theta_{t0}$ denotes a sound source direction estimated at a start time to of a target segment for determining mobile sound source likeness. According to the above formula, the weight based on mobility of the sound source is calculated on the basis of the degree of divergence (i.e., what degrees the direction is deviated) from the sound source direction estimated at the start time of the target segment for determining mobile sound source likeness.

The weight determination unit 112 calculates a weight to be used by the second correlation matrix calculation unit 204 further on the basis of the weight based on the mobile sound source likeness of the sound source. The weight is calculated by using, for example, the following formula.

[Math. 19]

$$\alpha_{\omega,t} = C\alpha_t^V \alpha_{\omega,t}^P \alpha_t^M \quad (19)$$

According to the present modified example, it is also possible to exclude the influence of noise that is temporally stationary but spatially non-stationary. Such noise sources include, for example, auto cleaning robots, and the like.

4.5. Fifth Modified Example

In a fifth modified example, an acoustic signal in which a voice is emphasized by a voice emphasizing filter using a second spatial correlation matrix is generated.

Figure 10:
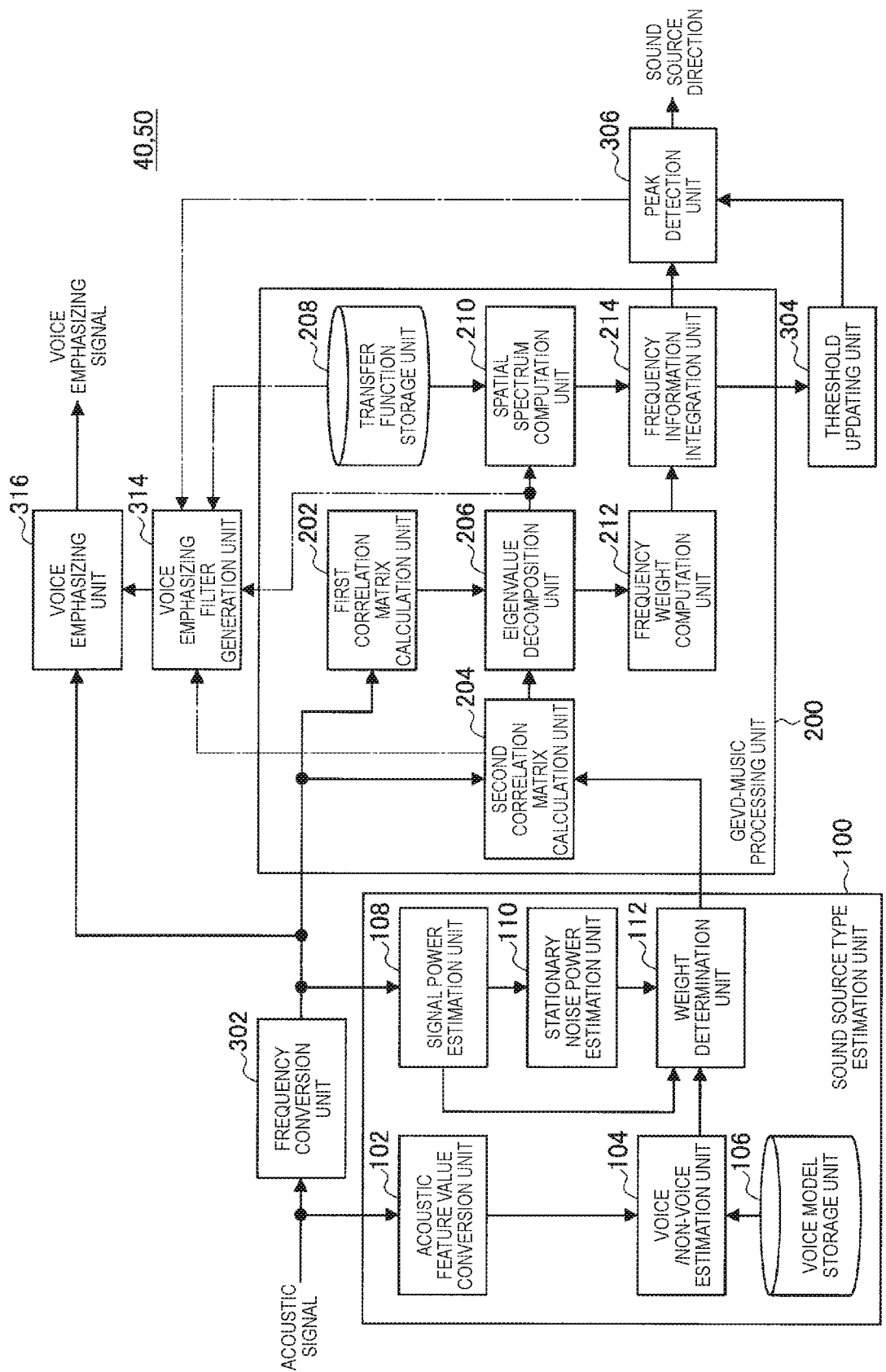
FIG. 10 is a block diagram illustrating a detailed example of a logical configuration of an information processing apparatus according to a fifth modified example.

FIG. 10 is a block diagram illustrating an example of a detailed logical configuration of an information processing apparatus 1 according to the fifth modified example. The information processing apparatus 1 according to the present modified example includes a voice emphasizing filter generation unit 314 and a voice emphasizing unit 316 in addition to the configuration illustrated in FIG. 3 as illustrated in FIG. 10.

The voice emphasizing filter generation unit 314 generates a filter that emphasizes a sound in a direction in which the peak has been detected. Note that the filter is expressed by a matrix for multi-channel output.

The voice emphasizing filter generation unit 314 may generate a filter with the following formula using a minimum variance (MV) method, for example, on the basis of output (the one-dot chain lines in the drawing) from the second correlation matrix calculation unit 204, the transfer function storage unit 208, and the peak detection unit 306.

[Math. 20]

$$w_{\omega,t} = \frac{K_{\omega,t}^{-1} a_{\omega,\theta}}{a_{\omega,\theta}^H K_{\omega,t}^{-1} a_{\omega,\theta}} \quad (20)$$

In addition, the voice emphasizing filter generation unit 314 may generate a Wiener filter using the following formula on the basis of output (indicated by the two-dot chain lines in the drawing) from the eigenvalue decomposition unit 206.

[Math. 21]

$$W_{\omega,t} = E_{\omega,t}(I - \Lambda_{\omega,t}^{-1})E_{\omega,t}^{-1} \quad (21)$$

Here, $E_{\omega,t}$ denotes a matrix in which eigenvectors when generalized eigenvalue decomposition is performed at a frequency $\omega$ at a time t are arranged. $\Lambda_{\omega,t}$ denotes a matrix in which eigenvalues are arranged in diagonal elements.

The voice emphasizing unit 316 generates a voice emphasizing signal that is a signal with suppressed stationary noise components by applying the voice emphasizing filter generated by the voice emphasizing filter generation unit 314 to a signal of a frequency component output from the frequency conversion unit 302.

In a case in which the voice emphasizing filter is generated using an MV method, for example, the voice emphasizing signal is calculated using the following formula.

[Math. 22]

$$y_{\omega,t} = w_{\omega,t}^H z_{\omega,t} \quad (22)$$

In addition, in a case in which the voice emphasizing filter is a Wiener filter, the voice emphasizing signal is calculated using the following formula.

[Math. 23]

$$y_{\omega,t} = W_{\omega,t}^H z_{\omega,t} \quad (23)$$

According to the present modified example, it is possible to generate the voice emphasizing signal with suppressed stationary noise components.

Various modified examples are as described above.

The above-described various modified examples can be appropriately combined. For example, by combining the configuration illustrated in FIG. 3 with the configuration illustrated in FIG. 5, the weight determination unit 112 can calculate a first weight on the basis of a weight based on voice likelihood, a weight based on a power of stationary noise and a power of a signal, and a weight based on sudden noise likelihood.

5. EXPERIMENT RESULTS

The result of a comparative experiment for a proposed technique and a comparative technique will be described below. Here, the proposed technique is estimating a sound source direction by the information processing apparatus 1 according to the embodiment described above with reference to FIGS. 2 to 4. The comparative technique is a technique without estimating stationary noise, more specifically in a configuration in which the signal power estimation unit 108 and the stationary noise power estimation unit 110 are omitted from the sound source type estimation unit 100 in the configuration of the information processing apparatus 1 illustrated in FIG. 3. Note that the output of the weight determination unit 112 is 0 in the case of a voice and 1 in the case of a non-voice.

Figure 11:
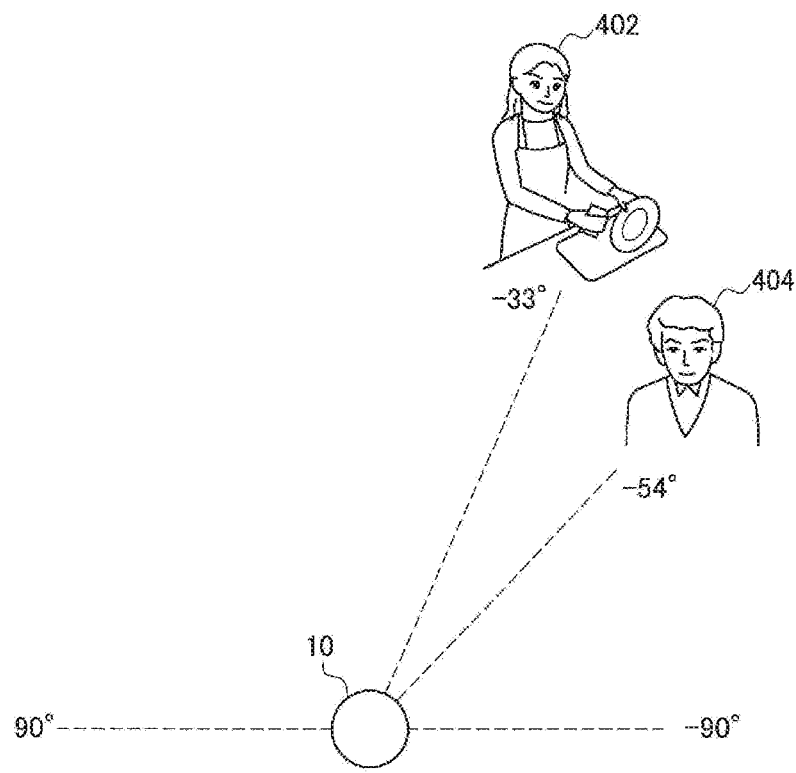
FIG. 11 is a diagram for describing experimental settings of a comparative experiment for a proposed technique and a comparative technique.
Figure 12:
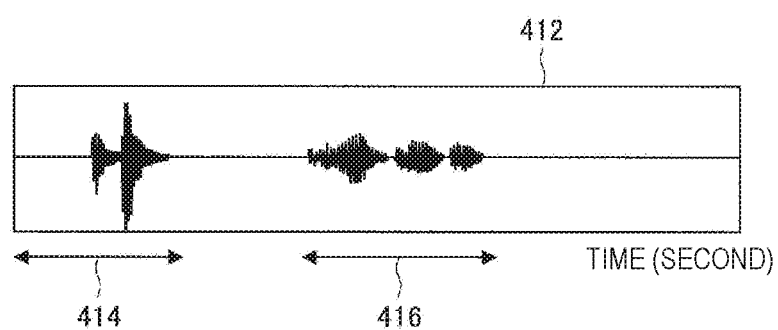
FIG. 12 is a diagram for describing experimental settings of a comparative experiment for a proposed technique and a comparative technique.

FIGS. 11 and 12 are diagrams for describing experimental settings of the comparative experiment for the proposed technique and the comparative technique. There is a noise source 402 in the direction of −33 degrees and a target sound source 404 in the direction of −54 degrees with respect to the sound collection device group 10 as illustrated in FIG. 11. The noise is the sound of dish washing and the target sound is the voice of a speaker. In addition, the sound collection device group 10 has eight sound collection devices. In FIG. 12, a waveform 412 of an acoustic signal output from the sound collection device group 10 is illustrated. The segment 414 corresponds to the sound from the noise source 402 and the segment 416 corresponds to the sound from the target sound source 404.

FIG. 13 is a diagram illustrating the experiment result of the comparative technique. In FIG. 13, a temporal change 420 of a spatial spectrum calculated using the comparative technique and a temporal change 430 of the estimation result of the sound source direction corresponding to the temporal change of the waveform 412 are illustrated. In the temporal change 420 of the spatial spectrum, the variation in color represents the presence/non-presence of sound in each direction. In the temporal change 430 of the sound source direction, the directions corresponding to the plots represent the estimation results of the sound source direction. Reference numerals 422 and 432 denote the portion corresponding to the noise of the segment 414, and reference numerals 424 and 434 denote the portion corresponding to the target sound of the segment 416.

Figure 14:
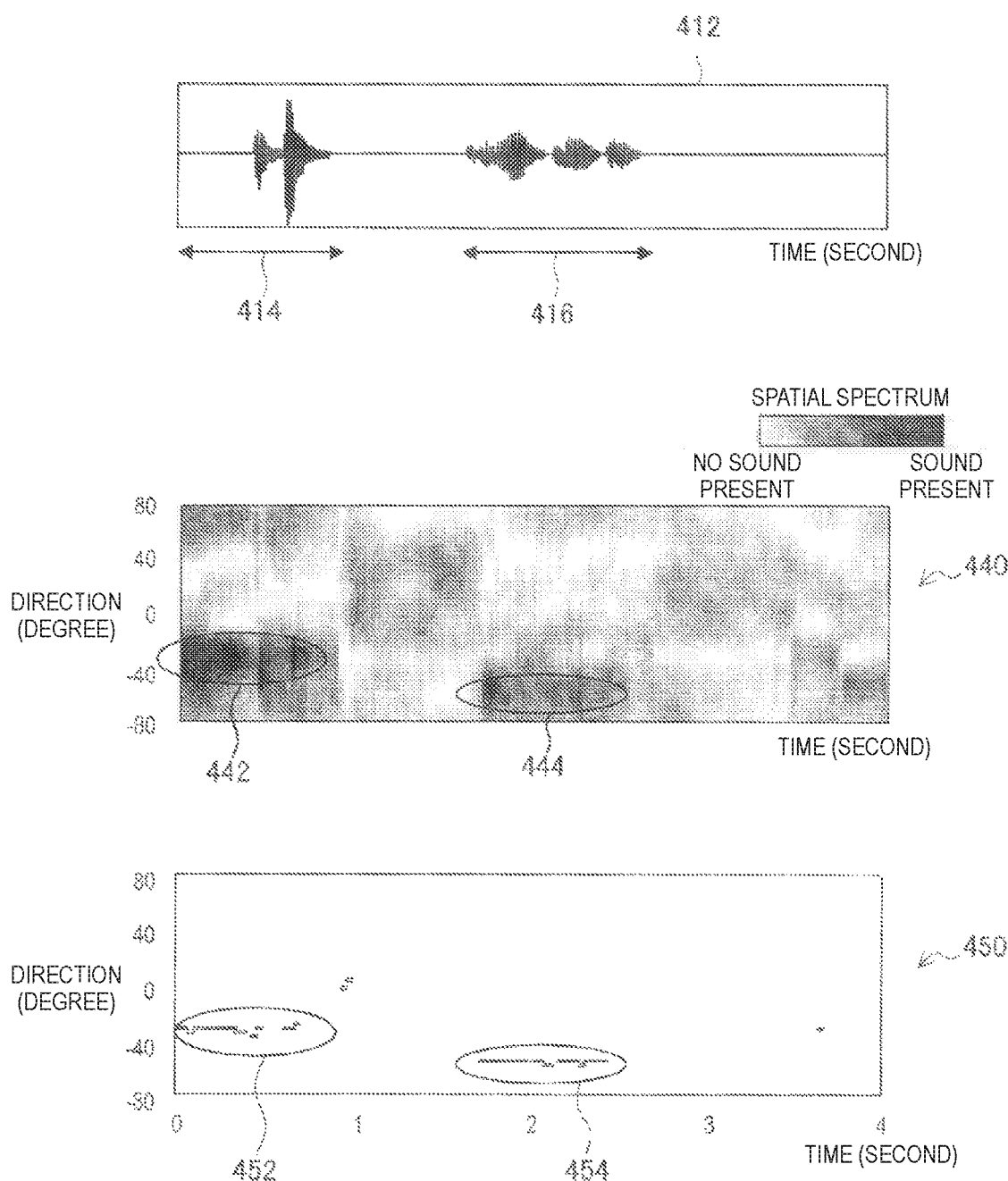
FIG. 14 is a diagram illustrating the experiment result of the proposed technique.

FIG. 14 is a diagram illustrating the experiment result of the proposed technique. In FIG. 14, a temporal change 440 of a spatial spectrum calculated using the proposed technique and a temporal change 450 of the estimation result of the sound source direction corresponding to the temporal change of the waveform 412 are illustrated. In the temporal change 440 of the spatial spectrum, the variation in color represents the presence/non-presence of sound in each direction. In the temporal change 450 of the sound source direction, the directions corresponding to the plots represent the estimation results of the sound source direction. Reference numerals 442 and 452 denote the portion corresponding to the noise of the segment 414, and reference numerals 444 and 454 denote the portion corresponding to the target sound of the segment 416.

According to the proposed technique, the direction of the noise source and the direction of the target sound source were correctly estimated as illustrated in FIG. 14.

On the other hand, according to the comparative technique, the direction of the target sound source was not correctly estimated as denoted by reference numeral 434 as illustrated in FIG. 13. The reason for this is thought that it was not possible to correctly detect the target sound of the segment 416 because the second spatial correlation matrix was calculated assuming that the sound of dishes of the segment 414 as a noise component. In addition, not only was it not possible to detect the target sound, but also a wrong direction of the target sound source was estimated. Furthermore, the direction of the noise source was incorrectly estimated as denoted by reference numeral 432. The reason for this is thought that a prior segment to the segment of the waveform 412 includes the sound of dishes, and the sound of dishes in the segment 414 was suppressed due to generalized eigenvalue decomposition performed using the sound as a noise component.

6. HARDWARE CONFIGURATION EXAMPLE

Figure 15:
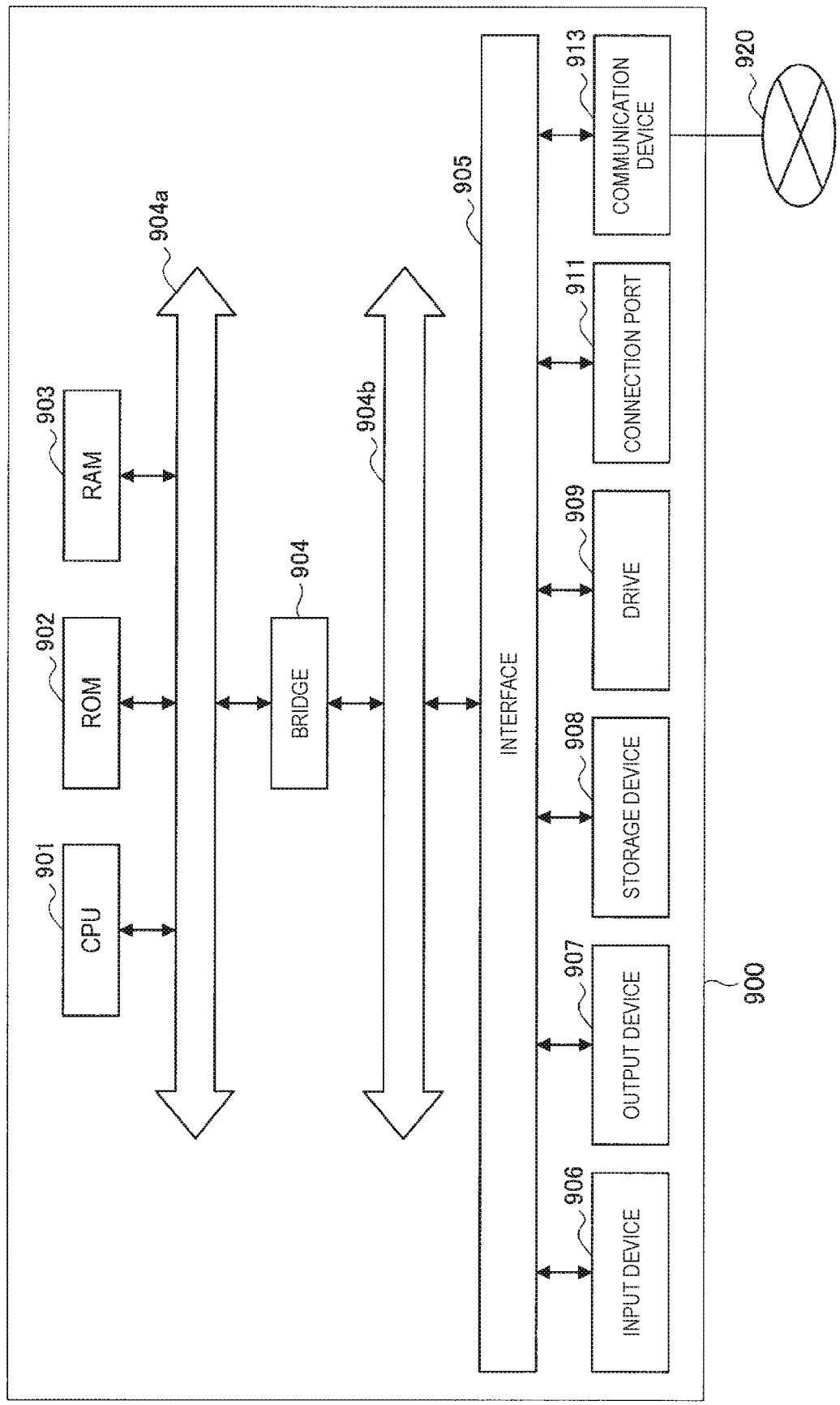
FIG. 15 is a block diagram illustrating an example of a hardware configuration of an information processing apparatus according to an embodiment.

Finally, a hardware configuration of an information processing apparatus according to the present embodiment will be described with reference to FIG. 15. FIG. 15 is a block diagram illustrating an example of the hardware configuration of the information processing apparatus according to the present embodiment. Meanwhile, an information processing apparatus 900 illustrated in FIG. 15 may realize the information processing apparatus 1 illustrated in FIG. 2 and FIG. 7, for example. Information processing by the information processing apparatus 1 according to the present embodiment is realized according to cooperation between software and hardware described below.

As illustrated in FIG. 15, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. The CPU 901 can form the acquisition section 20 and the control section 50 illustrated in FIG. 2 and FIG. 7, for example.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever. In addition, the input device 906 may be a remote control device using infrared ray or other electric waves or external connection equipment such as a mobile phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906. The input device 906 may constitute, for example, the sound collection device group 10 illustrated in FIGS. 2 and 7.

The output device 907 is formed by a device that may visually or aurally notify the user of acquired information. As such devices, there is a display device such as a CRT display device, a liquid crystal display device, a plasma display device, an EL display device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts acoustic signals including reproduced sound data, audio data and the like into analog signals and aurally outputs the analog signals. The output device 907 may constitute, for example, the output unit 30 illustrated in FIGS. 2 and 7. In addition, the output device 907 may constitute, for example, the reproduction device 60 illustrated in FIG. 7.

The storage device 908 is a device for data storage, formed as an example of a storage section of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the storage section 40 illustrated in FIG. 2 and FIG. 7, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), Long Term Evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like. The communication device 913 may form the acquisition section 20 and the output section 30 illustrated in FIG. 2 and FIG. 7, for example.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to the present embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

7. CONCLUSION

Embodiments of the present disclosure have been described above in detail with reference to FIGS. 1 to 15. As described above, the information processing apparatus 1 according to the present embodiment acquires an acoustic signal indicating a sound collection result from the sound collection device group, calculates a first weight in accordance with the degree to which the acoustic signal is a signal obtained by observing stationary noise, and applies the first weight to a second spatial correlation matrix. Accordingly, the appropriateness of the noise segment employed to calculate the second spatial correlation matrix is evaluated with the degree to which it is a signal obtained by observing stationary noise, and the evaluation is reflected in the calculation of the second spatial correlation matrix. Thus, it is possible to prevent the estimation from being excessively dependent on a segment to be employed as a noise space and thus to improve estimation accuracy in estimation of a sound source direction.

In particular, in the present embodiment, the information processing apparatus 1 calculates a first weight on the basis of the degree to which an acoustic signal includes a voice and stationarity of the acoustic signal. Accordingly, it is possible to prevent target sound components and sudden noise from being used in the calculation of the second spatial correlation matrix, and as a result, to prevent performance on estimating a sound source direction from deteriorating. In addition, the information processing apparatus 1 can estimate a sound source direction in a state in which the influence of stationary noise is appropriately suppressed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the target sound is assumed to be, for example, a voice in the above-described embodiment, the present technology is not limited thereto. For example, an operating sound of a specific machine, crying of an animal, or the like may be a target sound and the sound source direction thereof may be estimated.

In addition, each device described in the present specification may be realized as a single device or parts of or the entire device may be realized as separate devices. For example, in the functional configuration example of the information processing apparatus 1 illustrated in FIG. 2, the acquisition section 20, the storage section 40, and the control section 50 may be included in a device such as a server that is connected to the sound collection device group 10 and the output section 30 by a network or the like.

Note that it is not necessary for the processing described in this specification with reference to the flowchart and the sequence diagram to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquisition section configured to acquire an acoustic signal indicating a sound collection result of a sound collection device group; and a control section configured to calculate a first weight in accordance with a degree to which the acoustic signal acquired by the acquisition section is a signal obtained by observing stationary noise and to apply the first weight to a noise spatial correlation matrix that is a spatial correlation matrix obtained from a noise signal.

(2)

The information processing apparatus according to (1), in which the control section estimates a sound source direction with respect to the sound collection device group on the basis of an eigenvalue obtained from generalized eigenvalue decomposition that is based on the noise spatial correlation matrix to which the first weight has been applied and a spatial correlation matrix of the acoustic signal to be estimated.

(3)

The information processing apparatus according to (2), in which the control section sequentially updates the noise spatial correlation matrix to which the first weight has been applied, which is subject to the generalized eigenvalue decomposition, on the basis of the past noise spatial correlation matrix to which the first weight has been applied.

(4)

The information processing apparatus according to (2) or (3), in which the control section weights a spatial spectrum calculated on the basis of a calculation result of the generalized eigenvalue decomposition using a second weight based on the eigenvalue and integrates the spatial spectrum, and estimates a direction in which a peak of the integrated spatial spectrum rises as the sound source direction.

(5)

The information processing apparatus according to (4), in which the control section estimates a direction in which a peak of a spatial spectrum rises exceeding a threshold value sequentially updated using a value of a past spatial spectrum as the sound source direction.

(6)

The information processing apparatus according to (4) or (5), in which the control section calculates a directivity pattern indicating a degree to which a sound arrives from each direction on the basis of the calculation result of the generalized eigenvalue decomposition and estimates a direction in which a peak rises in both the spatial spectrum and the directivity pattern as the sound source direction.

(7)

The information processing apparatus according to any one of (2) to (6), in which the sound source direction is a direction of arrival of a voice.

(8)

The information processing apparatus according to any one of (1) to (7), in which the first weight is a continuous value.

(9)

The information processing apparatus according to any one of (1) to (8), in which the control section calculates the first weight on the basis of a degree to which the acoustic signal includes a voice.

(10)

The information processing apparatus according to any one of (1) to (9), in which the control section calculates the first weight on the basis of stationarity of the acoustic signal.

(11)

The information processing apparatus according to (10), in which the stationarity is calculated on the basis of a power of the acoustic signal.

(12)

The information processing apparatus according to (10) or (11), in which the stationarity is calculated on the basis of a feature value of the acoustic signal.

(13)

The information processing apparatus according to any one of (1) to (12), in which the control section estimates mobility of a sound source and calculates the first weight in accordance with an estimation result.

(14)

The information processing apparatus according to any one of (1) to (13), in which the control section calculates the noise spatial correlation matrix on the basis of a reproduction signal of a sound that is a sound collected by the sound collection device group and is reproduced by a reproduction device.

(15)

The information processing apparatus according to any one of (1) to (14), in which the control section generates an acoustic signal in which a target sound is emphasized on the basis of the noise spatial correlation matrix.

(16)

An information processing method including:

acquiring an acoustic signal indicating a sound collection result of a sound collection device group; and calculating, by a processor, a first weight in accordance with a degree to which the acquired acoustic signal is a signal obtained by observing stationary noise and applying the first weight to a noise spatial correlation matrix that is a spatial correlation matrix obtained from a noise signal.

(17)

A program causing a computer to function as:

an acquisition section configured to acquire an acoustic signal indicating a sound collection result of a sound collection device group; and a control section configured to calculate a first weight in accordance with a degree to which the acoustic signal acquired by the acquisition section is a signal obtained by observing stationary noise and to apply the first weight to a noise spatial correlation matrix that is a spatial correlation matrix obtained from a noise signal.

REFERENCE SIGNS LIST 1 information processing apparatus
2 user
3 television receiver set
4 air conditioner
10 sound collection device group
20 acquisition section
30 output section
40 storage section
50 control section
60 reproduction device
100 sound source type estimation unit
102 acoustic feature value conversion unit
104 voice/non-voice estimation unit
106 voice model storage unit
108 signal power estimation unit
110 stationary noise power estimation unit
112 weight determination unit
114 acoustic feature value conversion unit
116 sudden noise estimation unit
118 noise model storage unit
120 mobile sound source estimation unit
200 GEVD-MUSIC processing unit
202 first correlation matrix calculation unit
204 second correlation matrix calculation unit
206 eigenvalue decomposition unit
208 transfer function storage unit
210 spatial spectrum computation unit
212 frequency weight computation unit
214 frequency information integration unit
216 directivity pattern computation unit
218 frequency information integration unit
302 frequency conversion unit
304 threshold updating unit
306 peak detection unit
308 peak detection unit
310 sound source direction estimation unit
312 transfer characteristic estimation unit
314 voice emphasizing filter generation unit
316 voice emphasizing unit

The invention claimed is:

1. An information processing apparatus, comprising:
an acquisition section configured to acquire an acoustic signal indicating a sound collection result of a sound collection device group; and
a control section configured to:
calculate a first weight based on a degree to which the acquired acoustic signal is a signal obtained by observation of stationary noise; and
apply the first weight to a noise spatial correlation matrix that is a spatial correlation matrix obtained from a noise signal.

2. The information processing apparatus according to claim 1, wherein
the control section is further configured to estimate a sound source direction with respect to the sound collection device group based on an eigenvalue obtained from generalized eigenvalue decomposition, and
the eigenvalue is obtained from the generalized eigenvalue decomposition that is based on the noise spatial correlation matrix to which the first weight has been applied and a spatial correlation matrix of the acoustic signal to be estimated.

3. The information processing apparatus according to claim 2, wherein the control section is further configured to sequentially update the noise spatial correlation matrix to which the first weight has been applied, which is subject to the generalized eigenvalue decomposition, based on the past noise spatial correlation matrix to which the first weight has been applied.

4. The information processing apparatus according to claim 2, wherein the control section is further configured to:
weight a spatial spectrum, wherein the spatial spectrum is calculated based on a calculation result of the generalized eigenvalue decomposition using a second weight based on the eigenvalue;
integrate the spatial spectrum; and
estimate a direction in which a peak of the integrated spatial spectrum rises as the sound source direction.

5. The information processing apparatus according to claim 4, wherein
the control section is further configured to estimate, as the sound source direction, a direction in which a peak of the spatial spectrum rises exceeding a threshold value, and
the threshold value is sequentially updated based on a value of a past spatial spectrum.

6. The information processing apparatus according to claim 4, wherein the control section is further configured to:
calculate a directivity pattern indicating a degree to which a sound arrives from each direction based on the calculation result of the generalized eigenvalue decomposition; and
estimate a direction in which the peak rises in both the spatial spectrum and the directivity pattern as the sound source direction.

7. The information processing apparatus according to claim 2, wherein the sound source direction is a direction of arrival of a voice.

8. The information processing apparatus according to claim 1, wherein the first weight is a continuous value.

9. The information processing apparatus according to claim 1, wherein the control section is further configured to calculate the first weight based on a degree to which the acoustic signal includes a voice.

10. The information processing apparatus according to claim 1, wherein the control section is further configured to calculate the first weight based on stationary of the acoustic signal.

11. The information processing apparatus according to claim 10, wherein the stationarity is calculated based a power of the acoustic signal.

12. The information processing apparatus according to claim 10, wherein the stationarity is calculated based a feature value of the acoustic signal.

13. The information processing apparatus according to claim 1, wherein the control section is further configured to:
estimate mobility of a sound source; and
calculate the first weight based on an estimation result.

14. The information processing apparatus according to claim 1, wherein the control section is further configured to calculate the noise spatial correlation matrix based on a reproduction signal of a sound that is a sound collected by the sound collection device group and is reproduced by a reproduction device.

15. The information processing apparatus according to claim 1, wherein the control section is further configured to generate the acoustic signal in which a target sound is emphasized based on the noise spatial correlation matrix.

16. An information processing method, comprising:
   acquiring an acoustic signal indicating a sound collection result of a sound collection device group;
   calculating, by a processor, a first weight based on a degree to which the acquired acoustic signal is a signal obtained by observing stationary noise; and
   applying, by the processor, the first weight to a noise spatial correlation matrix that is a spatial correlation matrix obtained from a noise signal.

17. A non-transitory computer-readable medium having stored thereon, computer-executable instructions which, when executed by a computer, cause the computer to execute operations, the operations comprising:
   acquiring an acoustic signal indicating a sound collection result of a sound collection device group;
   calculating a first weight based on a degree to which the acquired acoustic signal is a signal obtained by observing stationary noise; and
   applying the first weight to a noise spatial correlation matrix that is a spatial correlation matrix obtained from a noise signal.

* * * * *